United States Patent [19]

Rokugawa et al.

[11] Patent Number: 5,165,077
[45] Date of Patent: Nov. 17, 1992

[54] OPTICAL DROP-AND-INSERT APPARATUS

[75] Inventors: Hiroyuki Rokugawa, Kawasaki; Shigefumi Masuda, Yokohama; Nobuhiro Fujimoto, Ebina, all of Japan

[73] Assignee: Fujitsu Limited, Kawasaki, Japan

[21] Appl. No.: 484,052

[22] Filed: Feb. 23, 1990

[30] Foreign Application Priority Data

| Feb. 28, 1989 [JP] | Japan | 1-46905 |
| Jul. 17, 1989 [JP] | Japan | 1-182421 |
| Sep. 19, 1989 [JP] | Japan | 1-240872 |
| Oct. 31, 1989 [JP] | Japan | 1-281842 |
| Oct. 31, 1989 [JP] | Japan | 1-281844 |

[51] Int. Cl.$^5$ ............................................. H04J 14/08
[52] U.S. Cl. ................................. 359/138; 359/160
[58] Field of Search ............... 359/135, 137, 138, 139, 359/140, 160

[56] References Cited

U.S. PATENT DOCUMENTS

4,121,217 10/1978 Chen .................................... 359/137

OTHER PUBLICATIONS

IEE ECOC 88, Fourteenth European Conference on Optical Communication "Demonstration of Optical Drop-and-Insert for Accessing 2.24 GBIT/S Optical Transmission Systems Directly at the 140 MBIT/S Level".

Primary Examiner—Edward L. Coles, Sr.
Assistant Examiner—Kinfe-Michael Negash
Attorney, Agent, or Firm—Staas & Halsey

[57] ABSTRACT

An optical drop-and-insert apparatus which can process an optical signal in the form of an optical signal without converting the optical signal into an electric signal. The optical drop-and-insert apparatus expands the pulse width of an optical data pulse in an optical data pulse train on an optical highway and drops the optical data pulse to form an empty bit at the bit of the optical data pulse or another bit so that a new optical data pulse may be inserted into the empty bit. Miniaturization of the apparatus and increase in processing speed can be attained by enabling processing of an optical signal while it remains in the form of an optical signal.

21 Claims, 22 Drawing Sheets

FIG. 8A
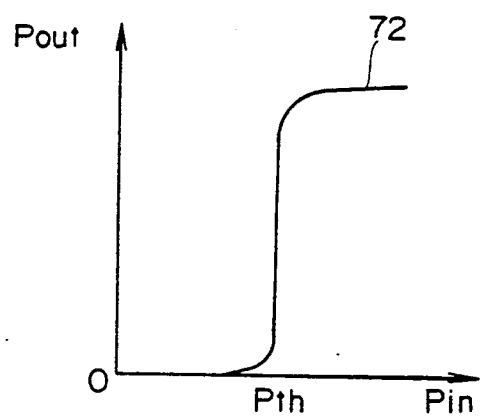
FIG. 8B
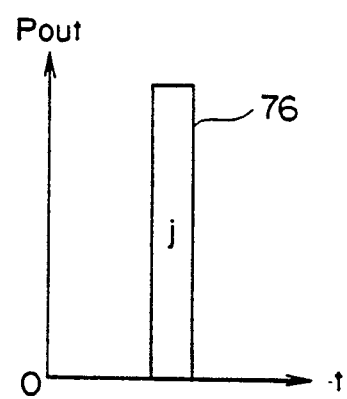
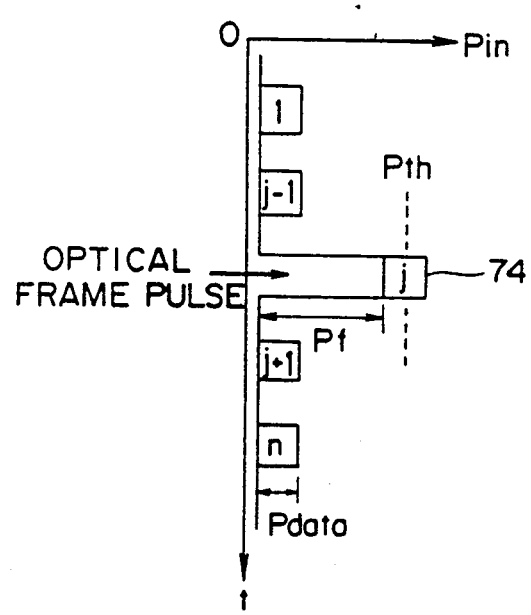
FIG. 8C

FIG. 9A
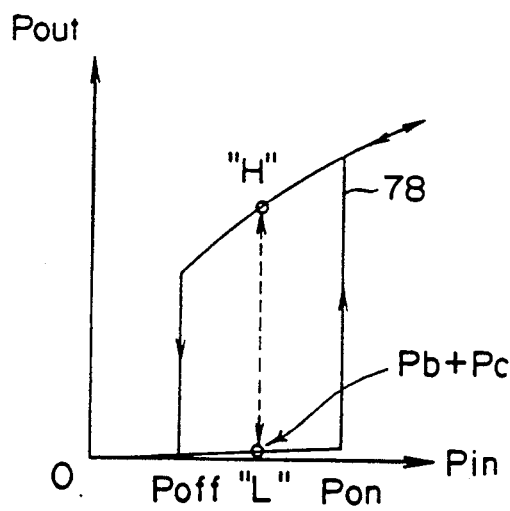
FIG. 9B
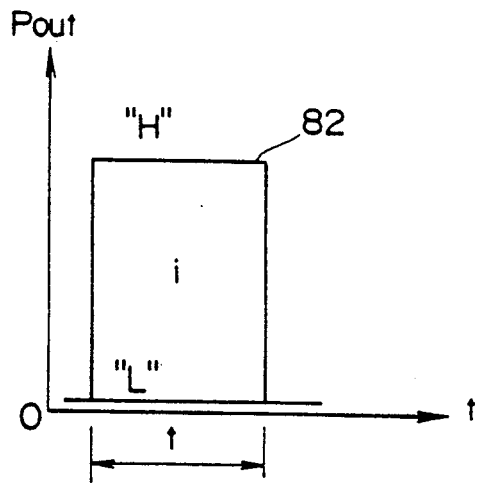
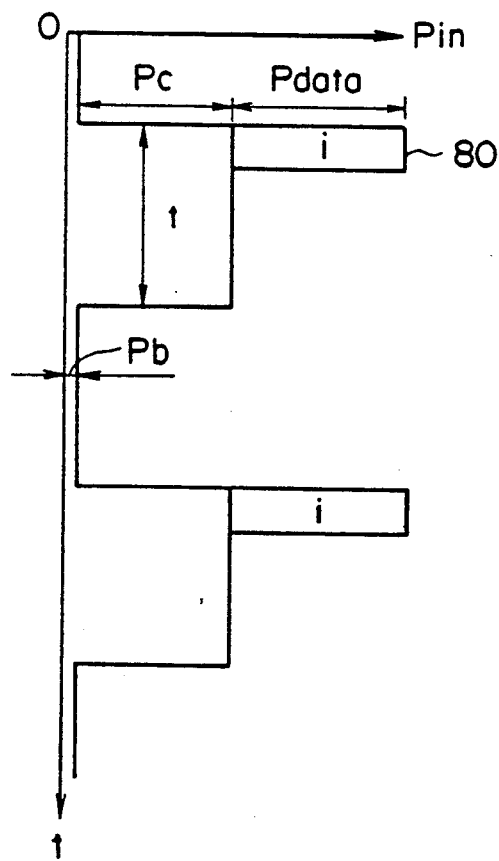
FIG. 9C $I_1$ WHEN $I_2$ IS CONSTANT $i(t) = i_p U(t)$  ($U(t)$: STEP FUNCTION)

$V(t) = i_p R(1 - e^{-t/RC}) U(t)$

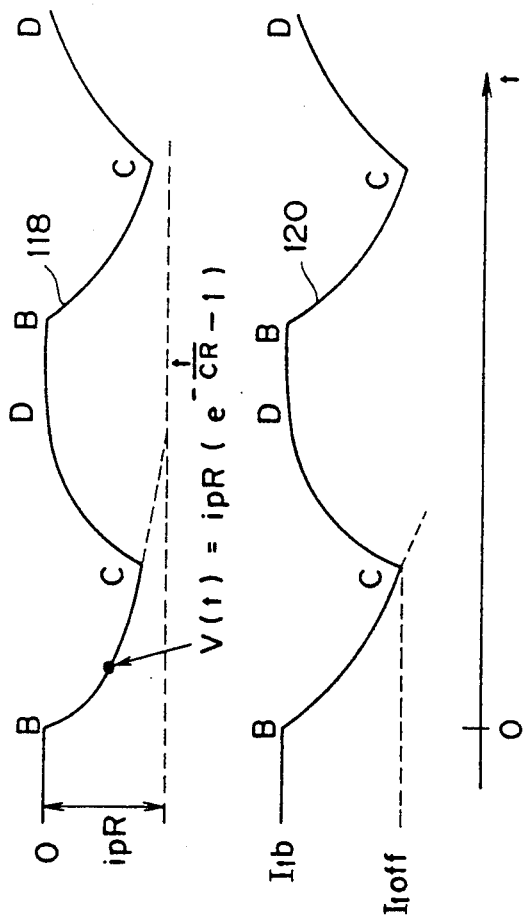
FIG.17A  INPUT LIGHT
FIG.17B  OUTPUT LIGHT OF BISTABLE SEMICONDUCTOR LASER
FIG.17C  PHOTOELECTRIC CURRENT THROUGH PHOTODIODE
FIG.17D  POTENTIAL AT POINT A
FIG.17E  CURRENT $I_1$
$$V(t) = ipR(e^{-\frac{t}{CR}} - 1)$$

OPTICAL DROP-AND-INSERT APPARATUS

BACKGROUND OF THE INVENTION

This invention relates to an optical drop-and-insert apparatus which can be applied to an optical fiber network, and more particularly to an optical drop-and-insert apparatus which has an optical dropping function for selectively extracting desired optical data from an optical data pulse train on an optical highway multiplexed on the time base and sending the thus extracted optical data to an optical terminal and an optical inserting function for placing optical data from an optical terminal onto an empty time slot of the optical highway.

As development of an optical communication network progresses, various investigations are made for a system of transmission and reception of optical signals such as realization of an optical switching system, building of a system of the optical subscriber type or the like. Above all, realization, for example, of an optical subscriber transmission network with which an optical fiber transmission line is introduced into a subscriber in order to send a large amount of optical signals such as video signals at a high speed to the subscriber or to permit the subscriber to transmit and receive such information to and from another subscriber is one of subjects to be realized for an optical communication network. To this end, it is necessary to carry out processing of signals such as dropping or insertion of signals or cross-connection.

In optical subscriber networks proposed so far, a transmission processing node is provided on an optical highway in order to allow access between the optical highway and an optical subscriber. Such transmission processing node has such three basic functions as given below.

(1) A dropping function to extract desired data from the optical highway to a terminal of the optical subscriber.

(2) An inserting function to place data from the optical subscriber into an empty time slot of the optical highway to transmit the data.

(3) A cross-connecting function to exchange time slots or channels of data on the optical highway.

In an exemplary one of common transmission processing nodes proposed so far, such processes as described above are all based on processing of electric signals. More particularly, for example, in a dropping process, an optical signal on an optical highway is first converted into an electric signal by a photoelectric converting section at a transmission processing node, and then converted into an optical signal for a subscriber by an electro-optic converting section for the subscriber in order to transmit the signal to the subscriber. On the other hand, in an inserting process, an optical signal from the subscriber is converted into an electric signal by a photoelectric converting section and then joined with data of the optical highway, whereafter it is converted into an optical signal by an electro-optic converting section for the optical highway and sent into the optical highway.

However, in order to deal with an optical signal of a very high speed on an optical highway and besides achieve dropping, insertion and cross-connection or the like for multichannel optical subscriber lines based on electric processing, very high speed multichannel photoelectric and electro-optic processing sections and electric signal processing section are required. Consequently, signals to be treated are increased into a large amount, and accordingly, there are drawbacks that those processing sections may make a bottle neck in the phase of processing speed and that such processing devices are increased in scale as such channels increase.

An attempt to solve such drawbacks is disclosed in the following publication:

L. C. Blank et al: Demonstration of optical drop-and-insert for accessing 2.24 Gbit/s optical transmission systems directly at the 140 Mbit/s level, Technical digest of ECOC (European Conference on Optical Communication) '88, pp. 463-466.

A method of dropping and insertion disclosed in the publication is that a 2×2 optical switch is interposed intermediately of an optical highway such that it is switched at a predetermined timing to drop an optical data pulse of a desired time slot and insert another optical data pulse into the time slot. With the method, however, since the thus dropped data pulse remains at a high speed (2.24 Gbit/s in the example given), a receiving device including a high speed electronic circuit is essentially required in order to receive such optical data. Therefore, the method does not successfully solve the above described technical subject completely.

SUMMARY OF THE INVENTION

It is an object of the present invention to provide an optical drop-and-insert apparatus which can reduce the speed of an optical signal of an optical highway and drop the optical signal in the form of an optical signal without converting the optical signal into an electric signal.

It is another object of the present invention to provide an optical drop-and-insert apparatus which can raise the speed of a low speed optical signal in the form of an optical signal in conformity with the transmission speed of an optical highway and insert the optical signal into the optical highway.

According to an aspect of the present invention, an optical drop-and-insert apparatus comprises, as seen in FIG. 1 wherein the basic construction of the optical drop-and-insert apparatus is shown, optical branching means for receiving an optical data pulse train from an optical highway, branching the received optical data pulse train into at least three optical data pulse trains and outputting the thus branched optical data pulse trains in different routes; optical timing adjusting means for receiving an optical data pulse train from the optical branching means and outputting an optical frame pulse synchronized with a desired bit of the received optical data pulse train; pulse width expanding means for receiving an optical data pulse train and an optical frame pulse from the optical branching means and the optical timing adjusting means, respectively, and expanding the pulse width of an optical data pulse of a desired bit of the received optical data pulse train in accordance with the received optical frame pulse to output a reduced speed optical data pulse to an optical terminal; optical pulse erasing means for receiving an optical data pulse train and an optical frame pulse from the optical branching means and the optical timing adjusting means, respectively, and erasing an optical data pulse of a desired bit of the received optical data pulse train in response to the received optical frame pulse to output an optical data pulse train from which the optical data pulse of the desired bit is erased; pulse width reducing means for receiving a low speed optical data pulse and an optical frame pulse from the optical terminal and the optical timing adjusting means, respectively, and outputting a high speed optical data pulse synchronized with the received optical frame pulse in a synchronized relationship with an empty bit of an optical data pulse train received from the optical pulse erasing means; and optical joining means for receiving an optical data pulse and an optical data pulse train from the pulse width reducing means and the optical pulse erasing means, respectively, adding the received optical data pulse and optical data pulse train and outputting the added optical data pulse train.

With the optical drop-and-insert apparatus of the construction, an optical signal can be processed while it remains in the form of an optical signal, that is, without converting it into an electric signal. As a result, the optical drop-and-insert apparatus can cope with an increase of the amount of information to be transmitted, and even where the number of channels is increased, the optical drop-and-insert apparatus is not increased in scale.

The above and other features and advantages of the invention and the manner of realizing them will become more apparent, and the invention itself will best be understood, from a study of the following description and appended claims, with reference had to the attached drawings showing some preferred embodiments of the invention.

BRIEF DESCRIPTION OF THE DRAWINGS

FIG. 8 is a diagram illustrating an operation characteristic of an optical threshold element of the preferred embodiment of the present invention;

FIG. 9 is a diagram illustrating an operation characteristic of an optical bistable element of the preferred embodiment of the present invention;

FIG. 17 is a timing chart illustrating operation of the optical monostable multivibrator shown in FIG. 13;

DESCRIPTION OF THE PREFERRED EMBODIMENTS

Figure 1:
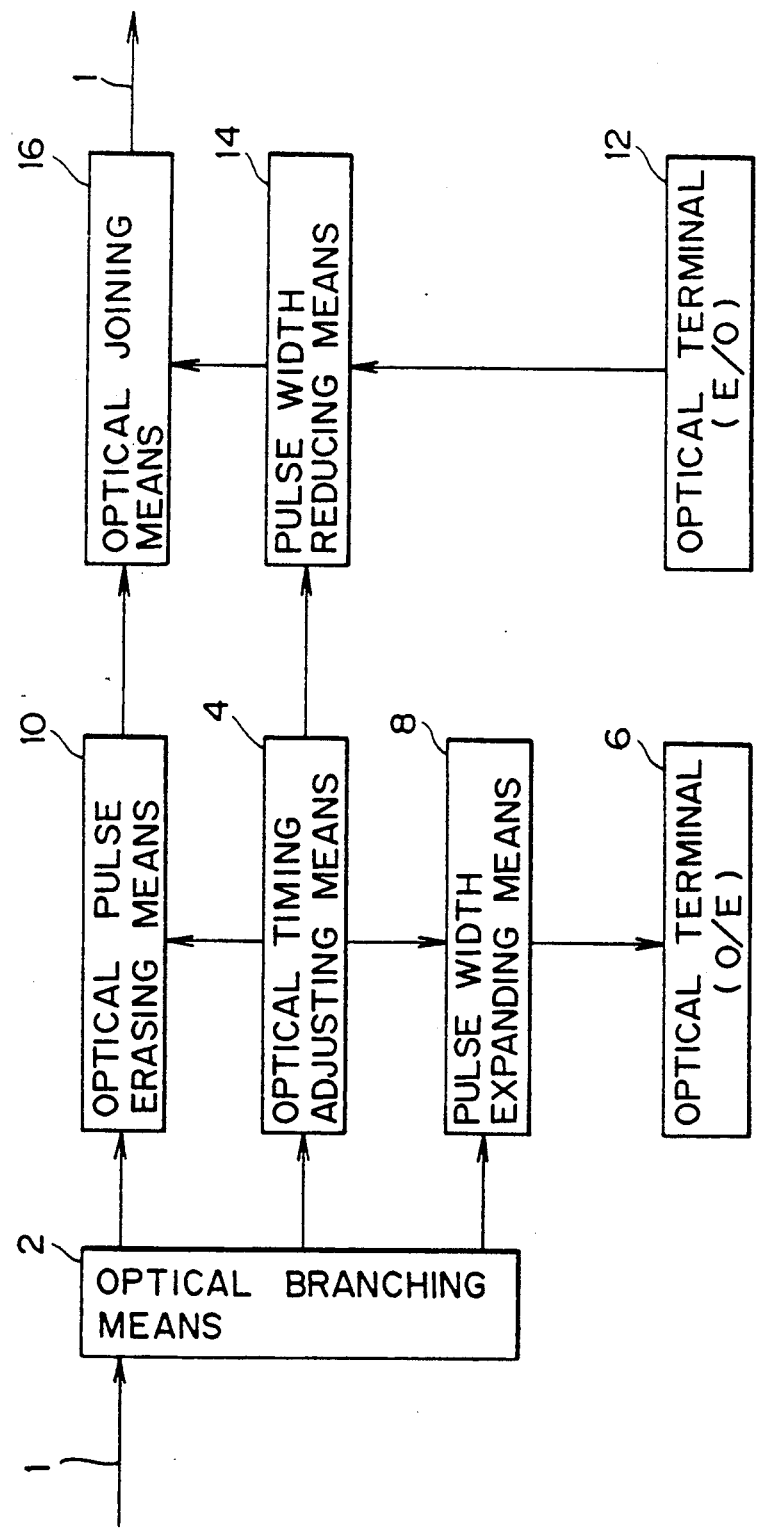
FIG. 1 is a block diagram of an optical drop-and-insert apparatus showing basic construction of the present invention.
Figure 2:
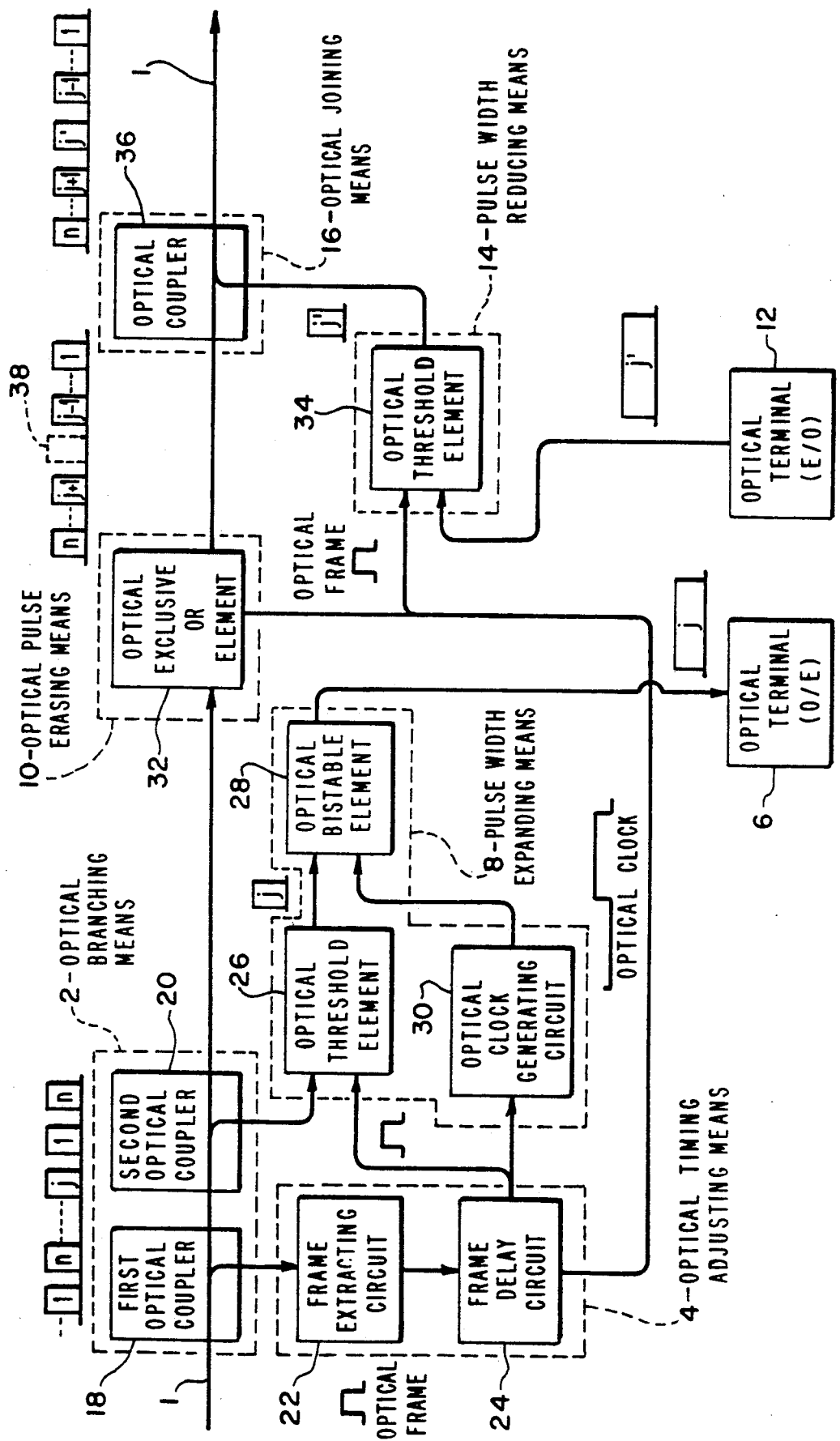
FIG. 2 is a block diagram of an optical drop-and-insert apparatus showing a preferred embodiment of the present invention.

Referring first to FIG. 2, there is shown a block diagram of an optical drop-and-insert apparatus showing a preferred embodiment of the present invention. In the present embodiment, optical branching means 2 includes a first optical coupler 18 for receiving an optical data pulse train from an optical highway 1 and branching the optical data pulse train thus received into two optical data pulse trains, and a second optical coupler 20 for receiving one of the optical data pulse trains from the first optical coupler 18 and branching the optical data pulse train into further two optical data pulse trains. An optical data pulse train transmitted on the optical highway 1 is multiplexed on the time base and is composed, in the present embodiment, of n bit pulse elements "1", ..., "j", ..., "n".

Optical timing adjusting means 4 includes a frame extracting circuit 22 for extracting an optical frame pulse from an optical data pulse train from the first optical coupler 18, and a frame delay circuit 24 for delaying an optical frame pulse from the frame extracting circuit 22 for a predetermined interval of time and outputting the optical frame pulse in a synchronized relationship with a desired bit. Such extraction of an optical frame pulse can be achieved, for example, in the following manner. If it is assumed now that an optical data pulse "l" is an optical frame pulse, then the wavelength of such optical frame pulse is made different from a wavelength of the other optical data pulses, and an optical data pulse train is introduced to an optical filter which transmits light of the wavelength of an optical frame pulse well but effectively interrupts light of any other wavelength. Consequently, an optical frame pulse can be extracted from an optical data pulse train by the optical filter.

Pulse width expanding means 8 includes an optical threshold element 26 which develops no optical output when an optical input is lower than a threshold level but develops a high optical output when an optical input exceeds the threshold level, an optical bistable element 28 which develops an optical output which has a hysteresis characteristic with respect to an optical input, and an optical clock generating circuit 30. An optical frame pulse from the frame delay circuit 24 is inputted to the optical threshold element 26 in a selectively overlapping relationship with a desired bit of an optical data pulse train from the second optical coupler 20. The optical clock generating circuit 30 forms an optical clock of a reduced speed in response to an optical frame pulse from the frame delay circuit 24. Such optical clock is overlapped with an optical data pulse from the optical threshold element 26 and inputted to the optical bistable element 28. Consequently, the duty of the optical data pulse is expanded, and the optical data pulse of the thus reduced speed is inputted to a photoelectric converting section of an optical terminal 6.

Optical pulse erasing means 10 includes an optical exclusive OR element 32.

Pulse width reducing means 14 includes an optical threshold element 34. The optical threshold element 34 receives an optical frame pulse from the frame delay circuit 24 and an optical data pulse of a low speed from an electro-optic converting section of another optical terminal 12. The threshold level of the optical threshold element 34 is set higher than a level of an optical data pulse and a level of an optical frame pulse but lower than a level of an optical frame pulse overlapped with an optical data pulse.

Optical joining means 16 includes an optical coupler 36 having at least two input ports to which the optical exclusive OR element 32 and the optical threshold element 34 are connected and at least one output port to which the optical highway 1 is connected on the downstream side thereof.

Figure 10:
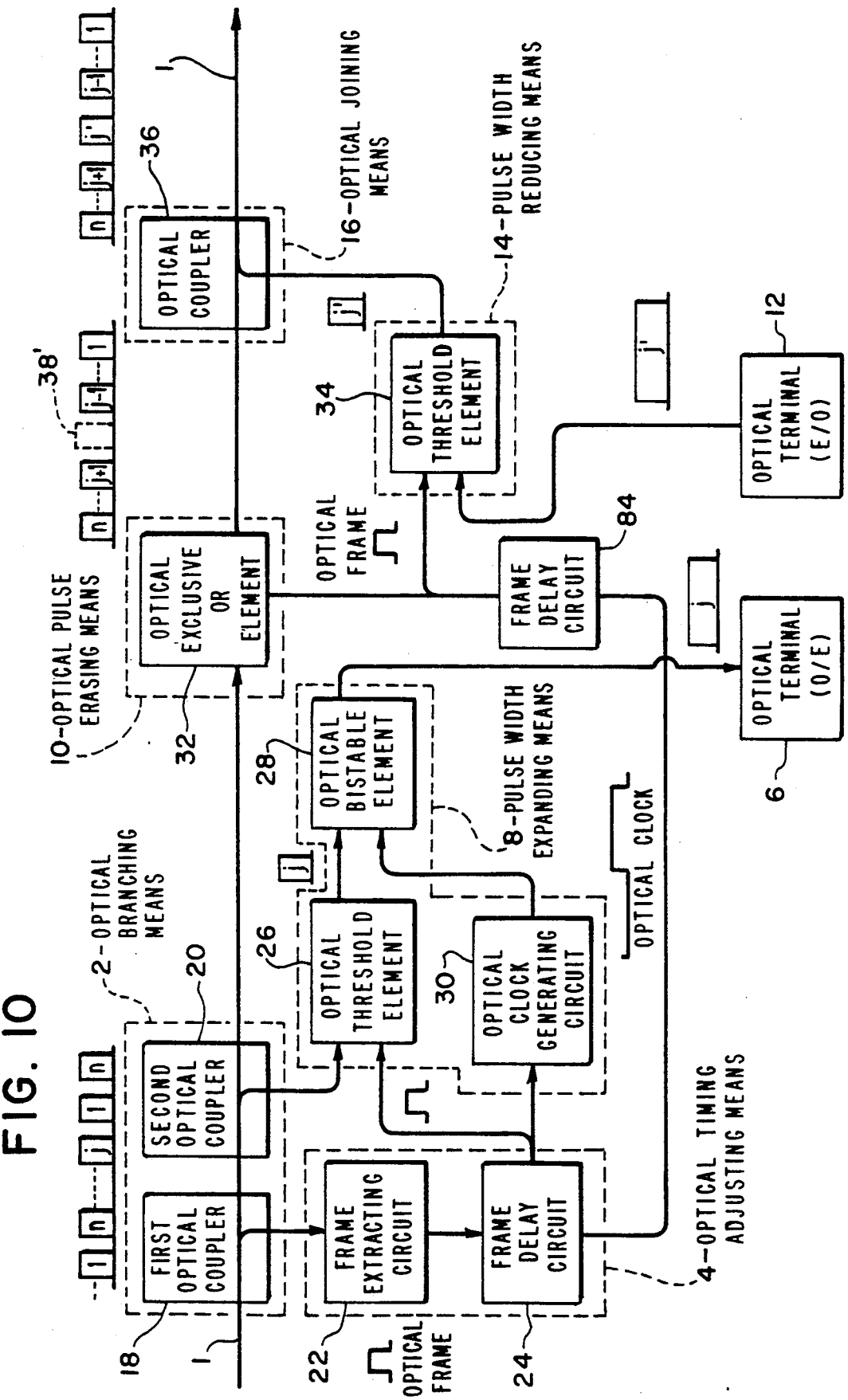
FIG. 10 is a block diagram of an optical drop-and-insert apparatus showing another preferred embodiment of the present invention.

In the present embodiment, a pulse "j" of an optical data pulse train is sampled with an optical frame pulse, reduced in speed with an optical clock and taken out to the optical terminal. The optical data pulse "j" is changed into an empty bit 38 by the optical pulse erasing means 10. An optical data pulse "j'" to be inserted from the optical terminal 12 is reduced in duty with the optical frame pulse by the pulse width reducing means 14, and the optical data pulse thus raised in speed is inserted into the empty bit 38 by the optical joining means 16. The reason why a bit with which an optical frame pulse from the frame delay circuit 24 is synchronized at the optical pulse erasing means 10 is caused to coincide with a bit with which the optical frame pulse is synchronized at the pulse width reducing means 14 is that it is intended to synchronize an optical data pulse to be inserted with an empty bit to prevent possible collision of optical data. Further, in the present embodiment, since a bit with which an optical frame pulse from the frame delay circuit 24 is synchronized at the pulse width expanding means 8 is caused to coincide with a bit with which the optical frame pulse is synchronized at the optical pulse erasing means 10 and the pulse width reducing means 14, the present embodiment is suitable for such an instance where optical data on an optical highway are exchanged by operation of an optical terminal or the like. Another embodiment wherein a dropping process is carried out such that particular optical data are shared by a plurality of optical terminals will be hereinafter described (FIG. 10).

Figure 3:
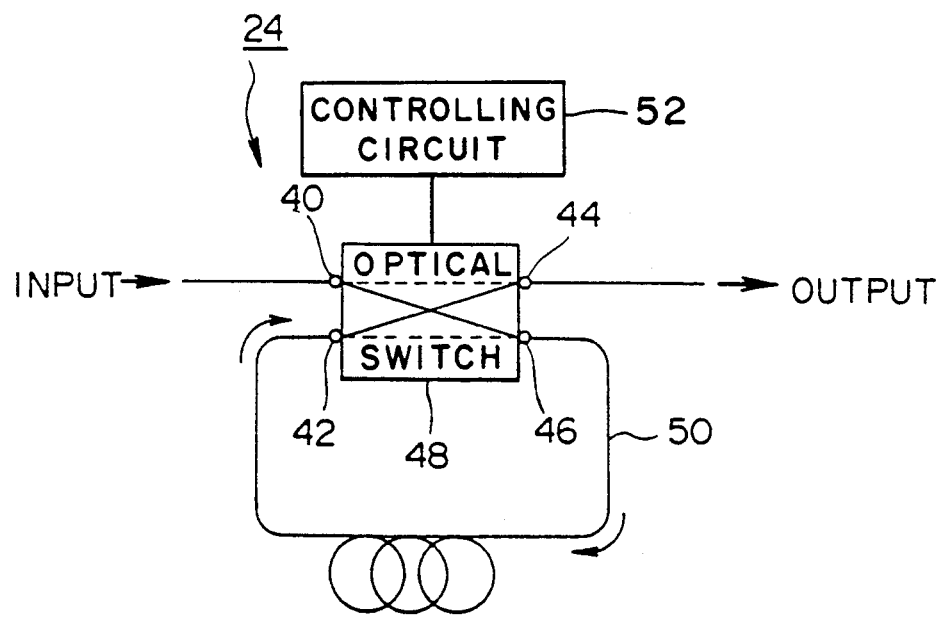
FIG. 3 is a diagrammatic representation showing an example of construction of a frame delay circuit of the preferred embodiment of the present invention.
Figure 4A:
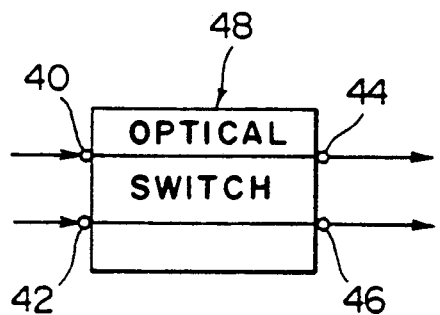
FIGS. 4A and 4B are diagrammatic representations showing a bar condition and a cross condition, respectively, of an optical switch which is a component of the frame delay circuit shown in FIG. 3.
Figure 4B:
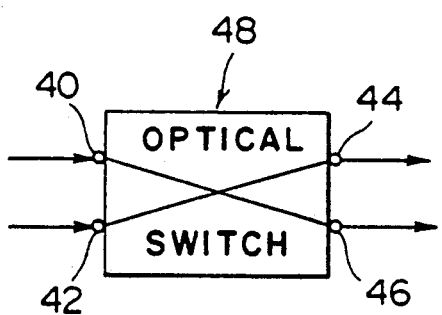

Referring now to FIG. 3, there is shown an example of construction of the frame delay circuit 24. In the present example, the frame delay circuit 24 includes an optical switch 48 having first and second input ports 40 and 42 and first and second output ports 44 and 46, an optical delay line 50 connected between the second output port 46 and the second input port 42 of the optical switch 48, and a controlling circuit 52 for the optical switch 48. The optical switch 48 can be switched between such a bar condition as shown in FIG. 4A wherein an optical signal received at the first input port 40 is outputted from the first output port 44 while another optical signal received at the second input port 42 is outputted from the second output port 46 and such a cross condition as shown in FIG. 4B wherein an optical signal received at the first input port 40 is outputted from the second output port 46 while another optical signal received at the second input port 42 is outputted from the first output port 44. The optical delay line 50 provides a delay time greater than the pulse width of an optical frame pulse. The controlling circuit 52 controls the optical switch 48 such that an optical frame pulse received at the first input port 40 may be taken into the optical delay line 50 in the cross condition of the optical switch 48 and the optical frame pulse thus taken in may be circulated, in the bar condition of the optical switch 48, by a required number of times in the optical delay line 50 until it is outputted from the first output port 44 in the cross condition again of the optical switch 48. With the construction of the frame delay circuit, a desired delay can be attained by switching of the optical switch 48, and accordingly, a frame delay circuit having a variable delay time can be provided with a simple construction. The optical switch 48 may be, for example, of a $LiNbO_3$ wave guide type. Meanwhile, the optical delay line 50 may be composed, for example, of a single mode optical fiber of a predetermined length.

Figure 5:
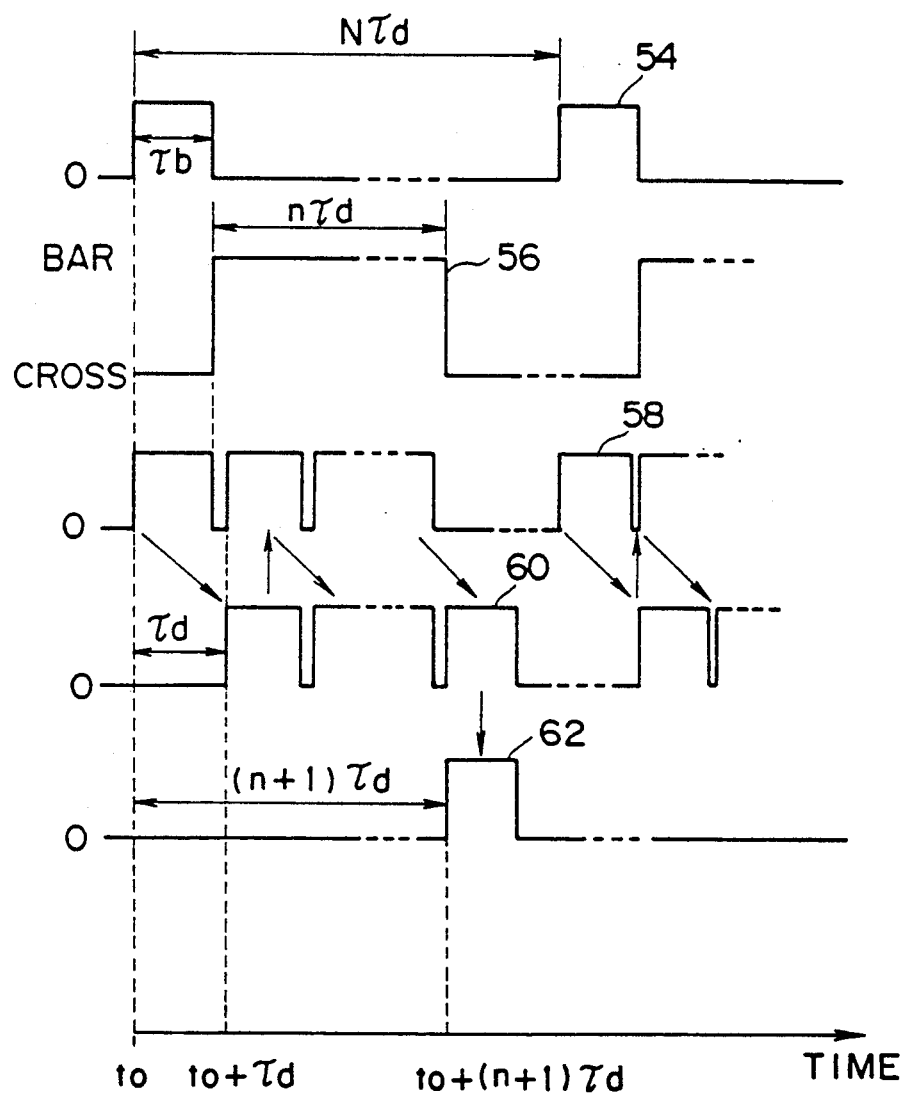
FIG. 5 is a timing chart illustrating operation of the frame delay circuit shown in FIG. 3.

FIG. 5 shows a timing chart of operation of the device shown in FIG. 3. A delay by the optical delay line 50 is represented by $\tau_d$. Reference numeral 54 denotes an optical frame pulse received at the first input port 40, 56 a drive signal (electric signal) for the optical switch 48, 58 an optical pulse outputted from the second output port 46, 60 an optical pulse received at the second input port 42, and 62 an optical pulse outputted from the first output port 44. A case is considered here wherein a train of cyclic optical frame pulses having a pulse width $\tau_b$ and a period $N\tau_d$ is inputted to the optical switch 48 by way of the first input port 40. The pulse width $\tau_b$ and the delay $\tau_d$ of the optical delay line 50 have a relationship given by $$\tau_b \leq \tau_d$$

Now, the examination will proceed ignoring a propagation time and a loss of an optical signal in the optical switch 48. It is assumed that an optical pulse is inputted at a point of time $t_0$ to the optical switch 48 by way of the first input port 40. In this instance, if the optical switch 48 is held in the cross condition, then the optical pulse will be outputted from the second output port 46. The optical pulse is then delayed for the time $\tau_d$ by the optical delay line 50 so that it is received at the second input port 42 at a point of time $t_0+\tau_d$. If the optical switch 48 remains in the cross condition then, the optical pulse will be outputted from the first output port 44 after a delay of the interval of time $\tau_d$. However, if the optical switch 48 is switched to the bar condition at a point of time between a point of time $t_0+\tau_b$ and the point of time $t_0+\tau_d$, then the optical pulse inputted by way of the second input port 42 is outputted from the second output port 46 so that it will thereafter be delayed again for the interval of time $\tau_d$. So long as the optical switch 48 continues to be in the bar condition, the optical pulse is repetitively delayed for the interval of time $\tau_d$ by the optical delay line 50. Then, if the optical switch 48 is switched to the cross condition at a point of time $t_0+(n+1)\tau_d$, then the optical pulse inputted at the point of time by way of the second input port 42 will be outputted at the same point of time from the first output port 44. In other words, the optical pulse is outputted after a delay of an interval of time $(n+1)\tau_d$. It is to be noted that n is an integral value which satisfies $n < N-2$.

Since an optical pulse is inputted cyclically to the optical switch 48, a train of cyclical optical frame pulses having a pulse width $\tau_b$ and a period $N\tau_d$ which are inputted to the optical switch 48 can be outputted after a delay of an interval of time $(n+1)\tau_d$ by repeating such a sequence of operations as described above with the period $N\tau_d$. In such sequence of operations, a desired delay with a unit $\tau_d$ can be provided to an optical pulse train by changing n in the condition given by $$0 \leq n < N-2 (n \text{ and } N \text{ are integers}).$$

If the function is applied, then when $\tau_d$ corresponds to a period of time for one time slot of an optical data pulse train transmitted on an optical highway while $\tau_b$ corresponds to a pulse width of an optical frame pulse, a delay for 1 bit unit (bit unit shift) of an optical frame pulse is obtained. Such application will be hereinafter described (FIG. 10).

By the way, while a loss at the optical switch 48 or the optical delay line 50 is ignored with the frame delay circuit shown in FIG. 3, where such loss cannot be ignored, it is effective to employ a construction wherein the optical delay line 50 includes an optical amplifier therein.

Figure 6:
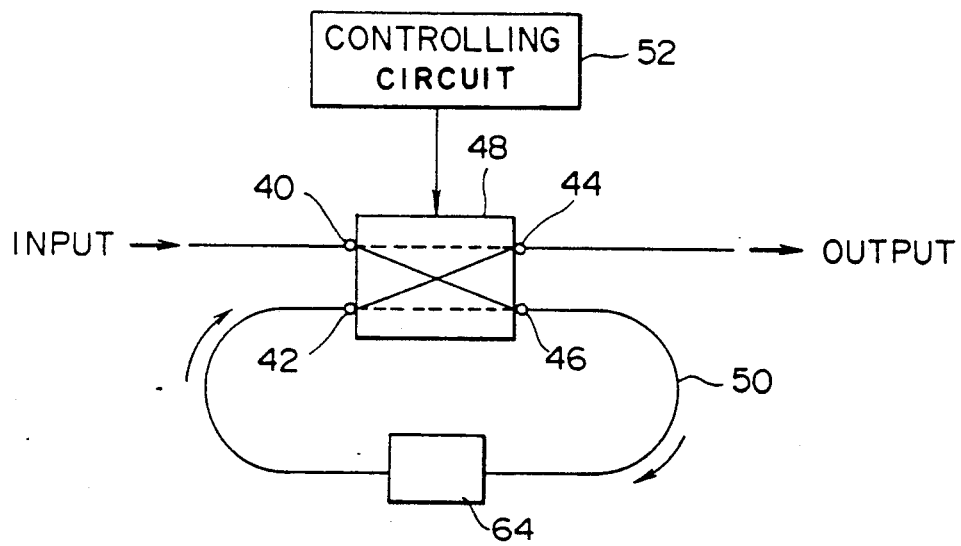
FIG. 6 is a diagrammatic representation showing another example of construction of a frame delay circuit of the preferred embodiment of the present invention.

FIG. 6 shows an example of such construction which includes an optical amplifier. In the example shown, an optical amplifier 64 of the semiconductor laser type is interposed intermediately of the optical delay line 50. Since the optical amplifier 64 has a gain for an optical signal inputted thereto, the gain G is set such that it may be, for example, equal to a loss L until the optical signal is outputted after its propagation so that the optical signal may not be attenuated even if it passes through the optical switch 48 and the optical delay line 50 by any number of times. With the construction, processing of optical data can be made without changing the amplitude of optical pulses.

Figure 7:
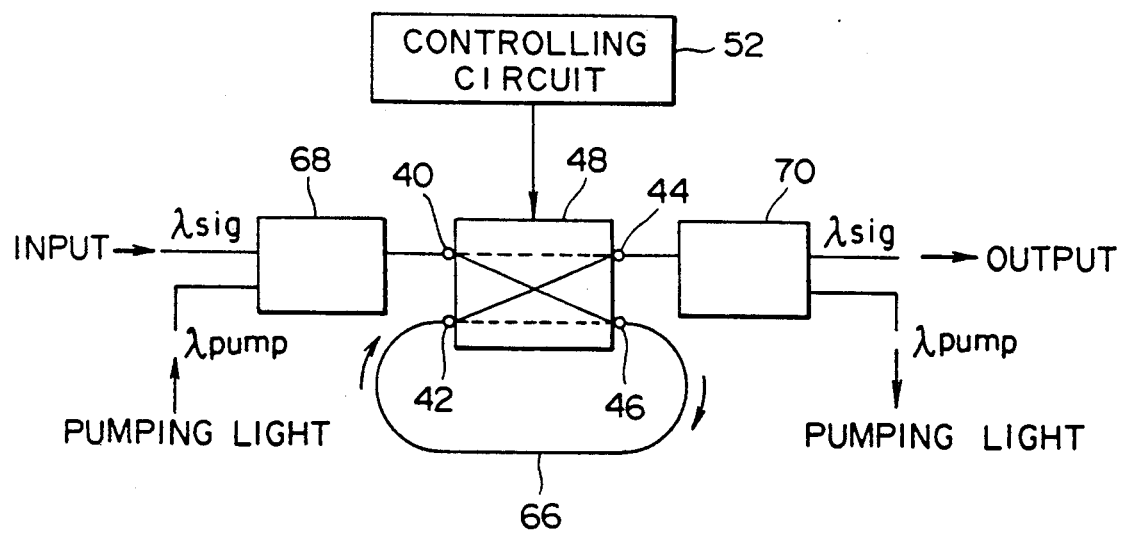
FIG. 7 is a diagrammatic representation showing a further example of construction of a frame delay circuit of the preferred embodiment of the present invention.

FIG. 7 shows another example of construction which includes an optical amplifier therein. In the present example, an optical amplifier 66 of the fiber type having a predetermined length is connected between the second output port 46 and the second input port 42 of the optical switch 48 so that it may function as an optical amplifier and also as an optical delay line. The optical amplifier 66 of the fiber type can be provided, for example, by doping, upon deposition on a portion of a preform for such optical amplifier which is to make a core in a process of production of such preform, the portion with a rare earth element such as Er or with ions of a rare earth element. An optical wave combining device 68 is connected to the first input port 40 while a wave separating device 70 is connected to the first output port 44. Then, pumping light of a wavelength $\lambda_{pump}$ is combined with signal light of a wavelength $\lambda_{sig}$ to be amplified by the optical wave combining device 68 while the signal light and the pumping light are separated in accordance with wavelengths by the optical wave separating device 70. The gain of the optical amplifier 66 of the fiber type can be set in accordance with an intensity of pumping light. Where the doping element is Er, in order to amplify signal light having a wavelength of a 1.55 $\mu$m band, a laser beam having, for example, a wavelength of a 1.49 $\mu$m band can be used as pumping light. On the other hand, where the doping element is Nd, in order to amplify signal light having a wavelength of a 1.3 $\mu$m band, a laser beam having, for example, a wavelength of a 0.8 $\mu$m band can be used as pumping light.

Subsequently, operation of the pulse width expanding means 8 is described in detail. An optical frame pulse from the frame delay circuit 24 is inputted to the optical threshold element 26 so that it may be overlapped with a desired bit of an optical data pulse train from the second optical coupler 20. As an optical data pulse of the bit with which the optical frame pulse is overlapped has a level higher than the threshold level of the optical threshold element 26, only the optical data pulse is outputted from the optical threshold element 26. Only optical data of a desired bit can be taken out from an optical data train in this manner.

An optical clock is inputted to the optical bistable element 28 in an overlapping relationship with the output optical pulse of the optical threshold element 26. Here, where the input power of the optical clock pulse is within a rising threshold level and a falling threshold level of the optical bistable element 28 and an output optical pulse of the optical threshold element 28 overlapped with the optical clock pulse has a level higher than the rising threshold level of the optical bistable element 28, the optical data pulse from the optical threshold element 26 is converted into a pulse having a duty equal to that of the optical clock pulse, and the pulse obtained by such conversion is outputted from the optical bistable element 28. In this manner, the pulse width of an optical data pulse can be increased to facilitate electric processing after then.

The optical clock generating circuit 30 generates and outputs an optical clock having a frequency which depends upon a bit rate B and a multiplicity N of an optical data pulse train. The power $P_o$ of such optical clock pulses is lower than a rising threshold level $P_{on}$ but higher than a falling threshold level $P_{off}$ of the optical bistable element 28 which will be hereinafter described (FIG. 9). Meanwhile, the power $P_b$ of a bias component between clock pulses is lower than the falling threshold level $P_{off}$, but the power $P_o+P_{data}$ of a pulse of data light overlapped with a clock pulse is higher than the rising threshold level $P_{on}$.

In other words, $$P_{off} < P_o < P_{on}$$

$$P_o + P_{data} > P_{on},$$

and $$P_b < P_{off}.$$

The optical clock generating circuit 30 can be constructed using an optical monostable multivibrator which is used in another example of construction of the pulse width expanding means 8 which will be hereinafter described.

The optical timing adjusting means 4 selects data of an arbitrary channel (for example, the j-th channel) from an n-channel optical data pulse train and outputs an optical frame pulse at a timing of a bit of the channel. The power (height) $P_f$ of the optical frame, and also $P_{data}$ of the optical data itself, is set lower than a threshold level $P_{th}$ of the optical threshold element 26 which will be hereinafter described, and the power (height) $P_f + P_{data}$ of an optical pulse obtained by overlapping an optical data pulse with the optical frame pulse is set higher than the threshold lever $P_{th}$ (refer to FIG. 8). In other words, $$P_f, P_{data} < P_{th},$$

and $$P_f + P_{data} > P_{th}.$$

The optical threshold element 26 has a characteristic (differential gain characteristic) that it develops, as seen from a curve 72 shown in FIG. 8, no optical output when an optical input $P_{in}$ thereto is lower than the threshold level $P_{th}$ thereof but develops, when the optical input exceeds the threshold level $P_{th}$, a high optical output $P_{out}$.

At the optical threshold element 26, an optical data pulse inputted from the second optical coupler 20 and an optical frame pulse inputted from the frame delay circuit 24 are overlapped with each other. Thus, an optical frame pulse is overlapped only with data of the j-th channel to make a pulse having a power higher than the threshold level $P_{th}$ as seen from a curve 74 of FIG. 8. As a result, optical data of a bit of the j-th channel is outputted from the optical threshold element 26 as seen from a curve 76 of FIG. 8.

Only desired optical data can be taken out from an optical data train in this manner. It is to be noted that an example of element and physical phenomenon having such a characteristic as described above is a differential gain characteristic, for example, of a semiconductor laser amplifier. Such example is disclosed in T. Nakai, et al., Jpn. J. Appl. Phys. 22, L130 (1983).

The output optical pulse of the optical threshold element 26 is inputted to the optical bistable element 28. The optical bistable element 28 develops an optical output $P_{out}$ which presents a hysteresis characteristic with respect to an optical input $P_{in}$ as seen, for example, from a curve 78 of FIG. 9. At the optical bistable element 28, an input optical pulse from the optical threshold element 26 and an optical clock pulse from the optical clock generating circuit 30 are overlapped with each other as seen from a curve 80 of FIG. 9. Consequently, the optical bistable element 28 is excited from a state of "Low" to another state of "High" by optical data. Then, even after such optical data disappears, the optical bistable element 28 remains in the "High" state due to the hysteresis characteristic thereof until after the optical clock falls.

As a result, an optical pulse having such a pulse width as is obtained by expanding the pulse width of the input optical pulse to the pulse width of the optical clock pulse is outputted from the optical bistable element 28 as seen from a curve 82 of FIG. 9. Accordingly, the duty of an optical pulse is expanded. In this manner, the output duty of optical data can be changed arbitrarily in accordance with a pulse width of an optical clock, and an optical pulse thus obtained is transmitted to the optical terminal 6.

It is to be noted that an example of element and physical phenomenon having such a characteristic as described above is, for example, a hysteresis characteristic of an optical bistable semiconductor laser and an optical memory operation making use of such hysteresis characteristic. Such characteristic is disclosed, for example, in M. Kuno et al., Extended Abstract (The 34th Spring Meeting, 1987) The Japan Society of Applied Physics and Related Societies, 29p-ZH-7, 1987 (in Japanese) and S. Suzuki et al., National Convention record, 1984, The Institute of Electronics, Information and Communication Engineers (in Japanese).

Subsequently, while operation of the optical pulse erasing means 10 will be hereinafter described, description is given of an example wherein bits of optical data to be dropped and optical data to be inserted are different from each other and another example of the pulse width expanding means 8.

FIG. 10 is a block diagram of an optical drop-and-insert apparatus showing an example wherein a bit of optical data to be dropped is different from a bit of optical data to be inserted. In the present example, in order to make a bit with which an optical frame pulse from the frame delay circuit 24 is synchronized at the pulse width expanding means 8 different from a bit with which the optical frame pulse is synchronized at the optical pulse erasing means 10 and the pulse width reducing means 14, an optical frame pulse to be inputted to the optical pulse erasing means 10 and the pulse width reducing means 14 is delayed by another frame delay circuit 84. With the construction, an empty time slot 38' can be formed at a bit (for example, at the i-th bit) different from the optical data "j" to be taken out by the optical terminal 6, and new optical data "i'" can be inserted into the empty time slot by way of the optical terminal 12. Accordingly, the present example is effective where the optical data "j" is necessitated by an optical terminal for another optical drop-and-insert apparatus.

Figure 11:
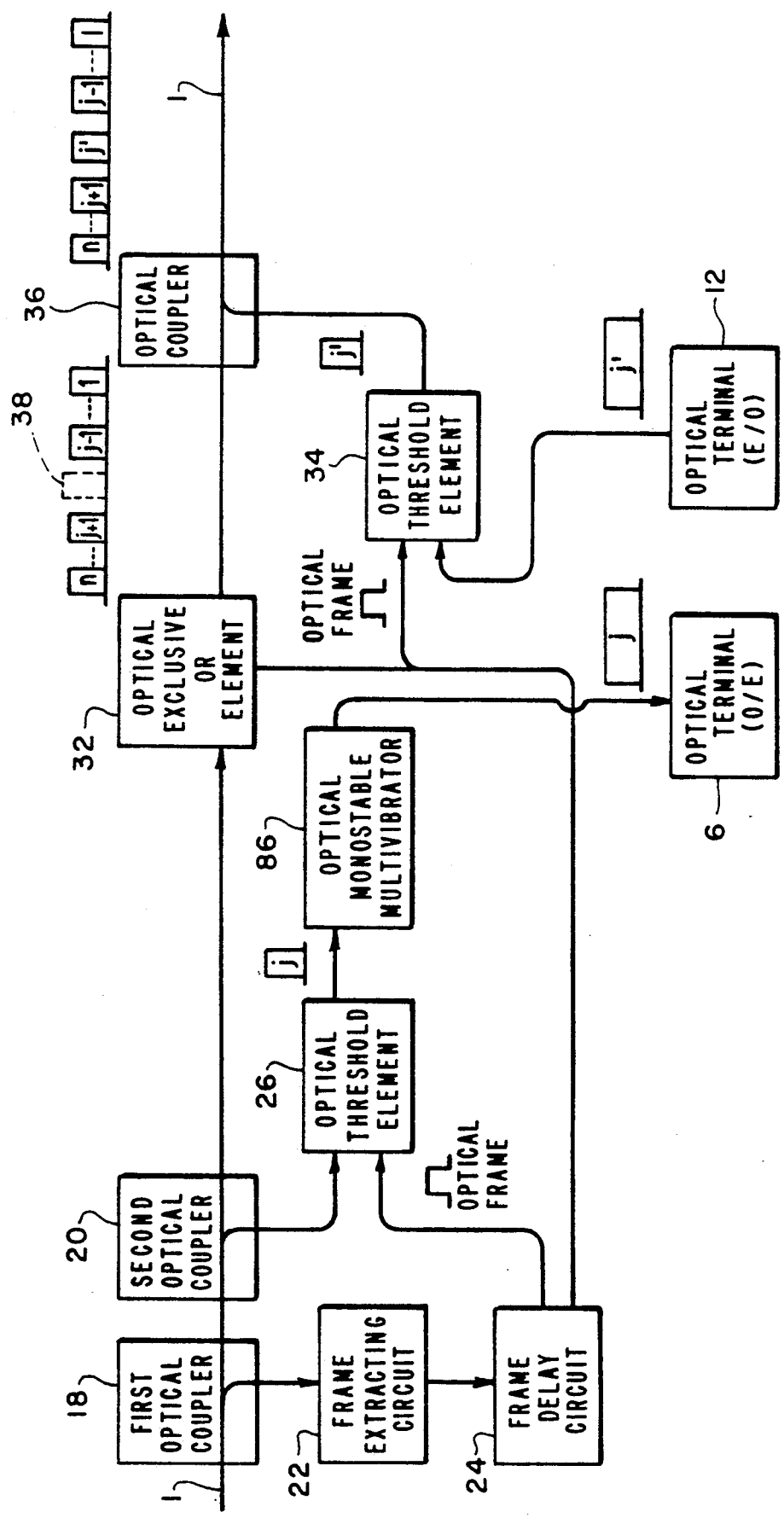
FIG. 11 is a block diagram of an optical drop-and-insert apparatus showing a further preferred embodiment of the present invention.

FIG. 11 is a block diagram of an optical drop-and-insert apparatus showing an embodiment wherein the pulse width expanding means has a different construction. In the present example, the pulse width expanding means is constituted from an optical threshold element 26 similar to that of the preceding embodiments, and an optical monostable multivibrator 86 for developing, when an optical data pulse is received from the optical threshold element 26, an optical data pulse having a pulse width greater than the pulse width of the input optical data pulse. In this instance, since the duty of an output optical data pulse is determined by the optical monostable multivibrator 86, no optical clock generating circuit is required. It is to be noted that, since dropping and insertion of optical data in the present embodiment are similar to those in the preceding embodiments, description thereof is omitted herein.

Figure 12:
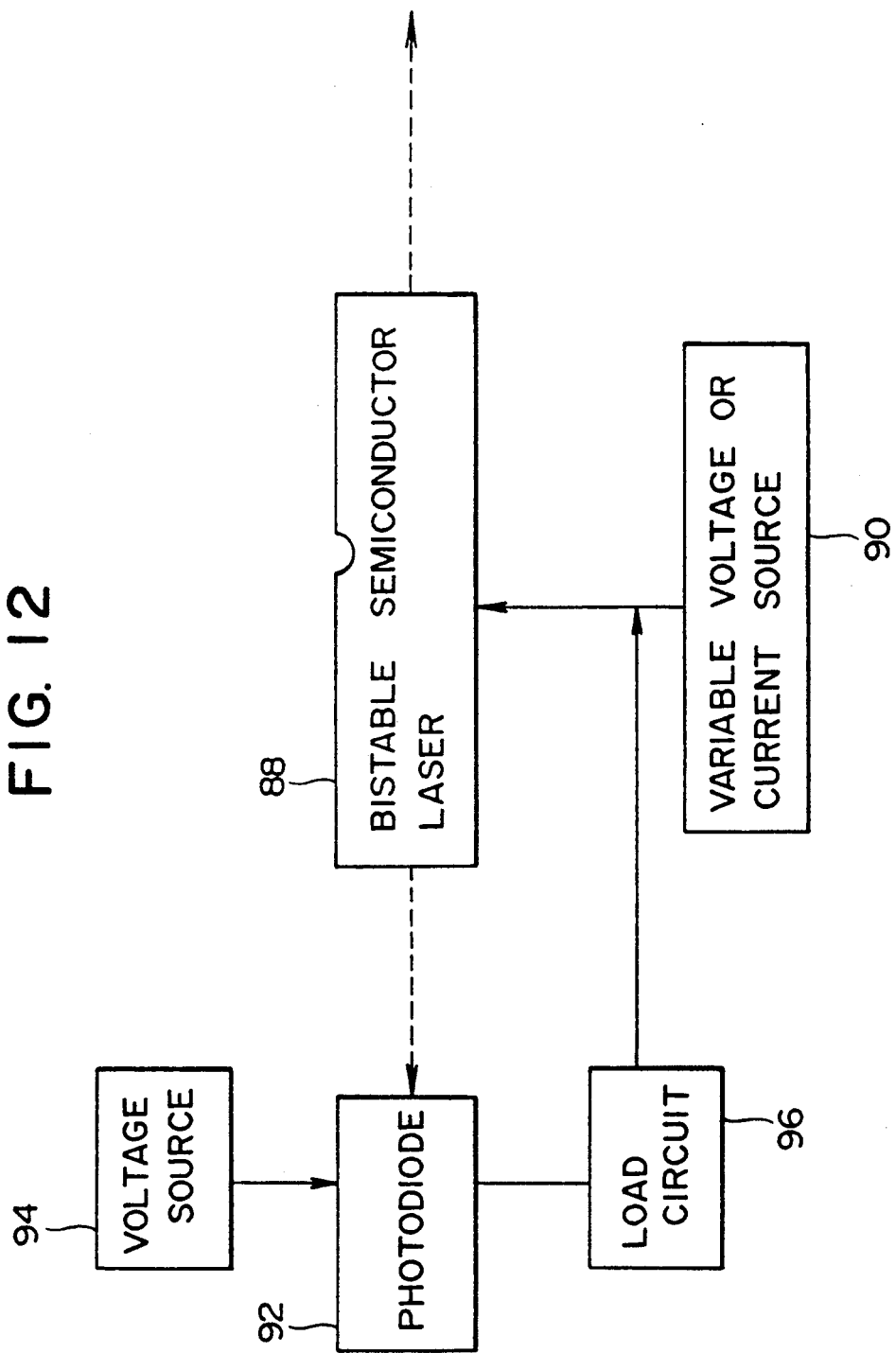
FIG. 12 is a block diagram showing basic construction of an optical monostable multivibrator shown in FIG. 11.

Basic construction of the optical monostable multivibrator 86 will be described with reference to FIG. 12. The optical monostable multivibrator is constituted such that, when an optical pulse is inputted to a bistable semiconductor laser, the semiconductor laser develops an output optical pulse having a pulse width greater than the pulse width of the input optical pulse.

Reference numeral 88 denotes a bistable semiconductor laser. The optical monostable multivibrator includes a variable voltage or current source 90 for applying a current bias to the bistable semiconductor laser 88 to allow the bistable semiconductor laser 88 to assume two stable states including an on-state and an off-state, a photodiode 92 for receiving part of output light of the bistable semiconductor laser 88, a voltage source 94 for applying a reverse bias to the photodiode 92, and a load circuit 96 through which a photoelectric current produced in the photodiode 92 flows.

A response signal to the photoelectric current through the load circuit 96 is fed back to the current bias to change over the bistable semiconductor laser 88, which has been changed into the on-state in response to inputting of an input optical pulse, into an off-state.

The bistable semiconductor laser 88 is constituted such that it can assume two stable states including an on-state and an off-state by means of the variable voltage or current source 90. When an input optical pulse is received by the bistable semiconductor laser 88 which has been reset into the off-state, the bistable semiconductor laser 88 is changed over into the on-state thereby to start its laser oscillation. After the bistable semiconductor laser 88 starts its laser oscillation, the photodiode 92 receives part of output light of the bistable semiconductor laser 88 so that a photoelectric current is produced in the photodiode 92 and flows through the load circuit 96. When such photoelectric current flows through the load circuit 96, a response signal to the photoelectric current is fed back to the current bias of the bistable semiconductor laser 88 to put the bistable semiconductor laser 88 out of a bistable region. Consequently, the bistable semiconductor laser 88 which has been in the on-state due to inputting of an optical pulse is reset into the off-state. Accordingly, an optical monostable multivibrator is provided wherein an optical pulse of a desired pulse width can be obtained in response to a response signal of the load circuit 96 and an input optical pulse is used as a trigger signal.

According to a preferred embodiment of the basic construction, the load circuit 96 includes a load resistor and a load capacitor through which a photoelectric current flows, and the pulse width of an output optical pulse is determined in accordance with a resistance of the load resistor and a capacitance of the load capacitor.

Meanwhile, according to another preferred embodiment of the basic construction, the load circuit 96 includes a first load resistor through which a photoelectric current flows, and a voltage across the first load resistor is amplified by means of a transistor.

, In the following, a preferred embodiment of the optical monostable multivibrator will be described.

Figure 13:
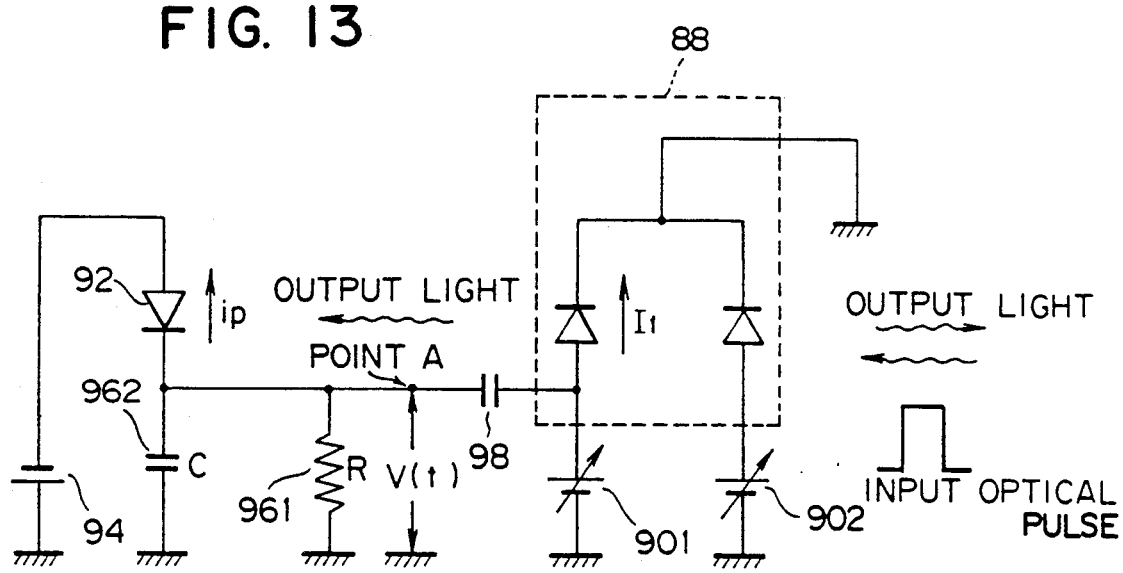
FIG. 13 is a circuit diagram showing detailed construction of the optical monostable multivibrator.
Figure 14:
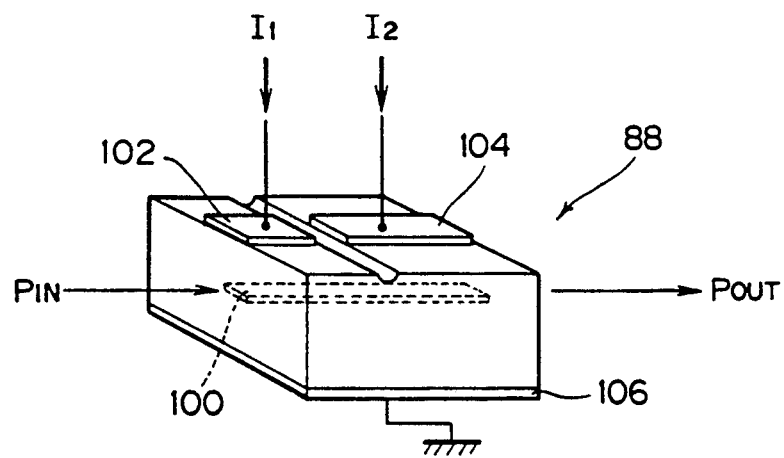
FIG. 14 is a schematic illustration of a bistable semiconductor laser which is a component of the optical monostable multivibrator.
Figure 15:
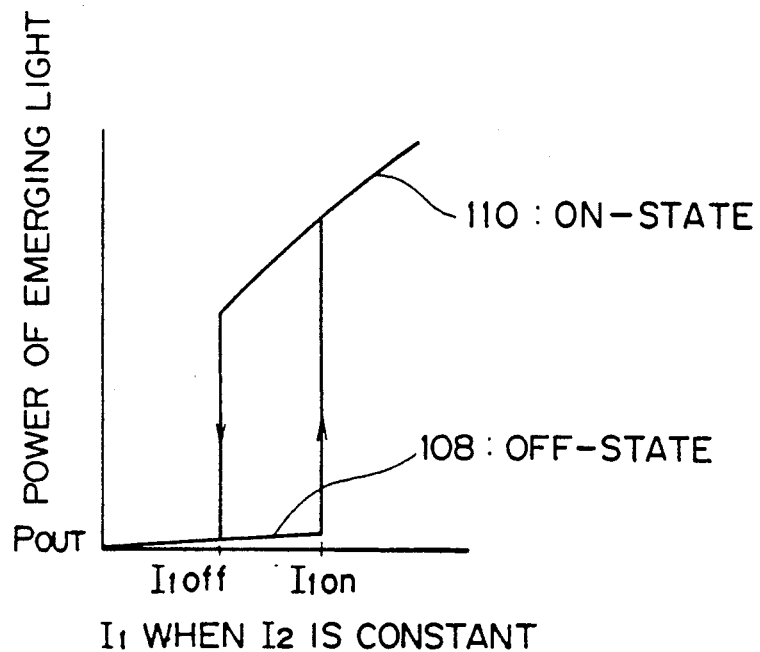
FIG. 15 is a diagram showing a hysteresis characteristic of the bistable semiconductor laser.

FIG. 13 is a circuit diagram of an optical monostable multivibrator showing a preferred embodiment, FIG. 14 is a schematic illustration showing construction of a bistable semiconductor laser which is a component of the optical monostable multivibrator, and FIG. 15 is a diagram illustrating a bistable characteristic.

Construction and operation of the bistable semiconductor laser are substantially similar to the construction and operation (FIG. 9) of the optical bistable element of the pulse width expanding means 8. However, since they are useful for the understanding of operation of the optical monostable multivibrator, detailed description thereof will be given below. As shown in FIG. 14, the bistable semiconductor laser 88 includes a pair of electrodes 102 and 104 divided in a longitudinal direction of an active layer 100 (direction of an optic axis). A common ground electrode 106 is formed on the rear face side of the electrodes. Where current biases $I_1$ and $I_2$ to be applied to the electrodes 102 and 104 are set to suitable values, an optical output $P_{OUT}$ varies with a hysteresis in response to a change of an optical input $P_{IN}$ or a change of the current bias $I_1$ or $I_2$, thereby providing a bistable characteristic.

FIG. 15 illustrates such bistable characteristic, and in FIG. 15, the axis of ordinate represents an optical output $P_{OUT}$ while the axis of abscissa represents the current bias $I_1$ when the other current bias $I_2$ is constant at a suitable value. If the current bias $I_1$ is gradually increased in a condition 108 wherein the bistable semiconductor laser 88 spontaneously emits light a little, the bistable semiconductor laser 88 is changed over into the on-state (laser beam emitting condition) 110 at a rising threshold level $I_{1ON}$. Once such on-state 110 is entered, the on-state is maintained until the current bias $I_1$ is reduced to a value lower than a falling threshold level $I_{1OFF}(<I_{1ON})$ of the bistable semiconductor laser 88. In short, the bistable semiconductor laser 88 has a characteristic that, at the current bias $I_1$ satisfying $$I_{1OFF} < I_1 < I_{1ON}$$

it can stably assume either one of the off-state 108 wherein it provides a low optical output and the on-state 110 wherein it provides a high optical output. While the hysteresis characteristic of an optical output described above is provided with respect to a current bias (injection current), if the current bias is fixed in a bistable region, then an optical memory operation can be provided. In particular, if a sufficiently high optical pulse is externally poured into the bistable semiconductor laser under the off-state while fixing the current bias $I_1$ to a value within the bistable region ($I_{1OFF}$ to $I_{1ON}$) in FIG. 15, then the semiconductor laser is changed over from the off-state 108 to the on-state 110 in response to the optical pulse. Then, even if the optical pulse is stopped, the on-state 32 is maintained as it is until after the current bias $I_1$ is reduced to a value lower than $I_{1OFF}$. Consequently, an optical memory operation can be provided with respect to an optical input. It is to be noted that the following description will proceed on the assumption that, when the bistable semiconductor laser 88 is in the off-state 108, the optical output thereof is zero ignoring an optical output which is provided by spontaneous emission of light thereof.

Referring to FIG. 13, the bistable semiconductor laser 88 is connected to a pair of variable voltage or current sources 901 and 902 for applying current biases to the bistable semiconductor laser 88 so as to allow the bistable semiconductor laser 88 to assume two stable states including an on-state and an off-state, that is, to allow the bistable semiconductor laser 88 to have a bistable region. Since optical coupling is available with the opposite end face sides of an active layer of the bistable semiconductor laser 88, the bistable semiconductor laser 88 is disposed such that output light from one of the opposite end face sides thereof may be introduced to the photodiode 92. A reverse bias is applied in an ordinary manner to the photodiode 92 by the voltage source 94. Consequently, when light is introduced to the photodiode 92, a photoelectric current is produced in the photodiode 92. Such photoelectric current $i_p$ produced in the photodiode 92 flows through a load circuit including a load resistor (having a resistance R) 961 and a load capacitor (having a capacitance C) 962. A response signal of the load circuit to the photoelectric current, that is, a voltage signal (high frequency signal) between the opposite ends of the load resistor 961 and load capacitor 962, is added to the current bias of the bistable semiconductor laser 88 by way of the capacitor 98. Here, the reason why the load circuit and the bistable semiconductor laser are interconnected using the capacitor 98 is that it is intended to prevent the operating point of the bistable semiconductor laser 88 from being varied by a dc component of a bias to the photodiode 92.

Figure 16:
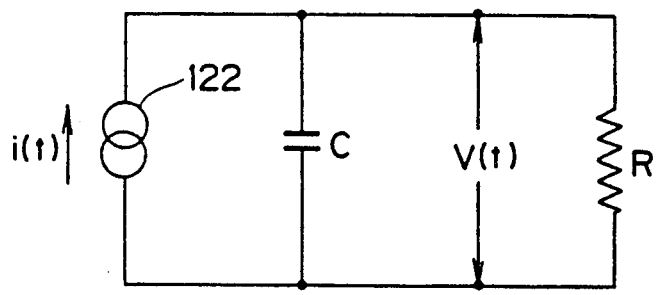
FIG. 16 is a circuit diagram of an equivalent circuit when an optical electric current $i_p$ flows through a photodiode shown in FIG. 13.

FIG. 16 is a circuit diagram of an equivalent circuit when a photoelectric current $i_p$ is produced in the photodiode 92, and FIG. 17 is a waveform diagram showing waveforms at various portions of the circuit of FIG. 13. In the waveform diagram, a curve 112 shows a waveform of an optical input, a curve 114 shows a waveform of an optical output of the bistable semiconductor laser 88, a curve 116 shows a waveform of a photoelectric current produced in the photodiode 92, a curve 118 shows a waveform of a potential at a connecting point (point A) between the photodiode 92 and the load circuit, and a curve 120 shows a waveform of the current bias to the bistable semiconductor laser 88 to which a response signal of the load circuit is added.

When an optical pulse having an optical power $P_{IN}$ is inputted from the outside to the bistable semiconductor laser 88, the bistable semiconductor laser 88 is changed over from the off-state to the on-state to start laser oscillation thereof. Then, when a beam of such laser oscillation is received by the photodiode 92, then a photoelectric current $i_p$ starts to flow through the photodiode 92. Since the response time of the photoelectric current $i_p$ is within such a range wherein it is sufficiently smaller than a time constant RC which is determined in accordance with the resistance R of the load resistor 961 and the capacitance C of the load capacitor 962, there is no essential contradiction even if the waveform of a photoelectric current flowing through the photodiode 92 is represented approximately with a waveform of a stepwise function as shown at 116 in FIG. 17. In this instance, the photodiode 92 in which the photoelectric current $i_p$ is produced can be regarded as a constant current source. Accordingly, the circuit diagram of an equivalent circuit wherein the photodiode 92 is connected to the load resistor 961 and the load capacitor 962 is such as shown in FIG. 16. In FIG. 16, reference numeral 122 denotes a constant current source of a photoelectric current, and the constant current source 122 supplies a step current i(t) represented by the following expression:

$$i(t) = i_p \cdot u(t) \tag{1}$$

where u(t) represents a step function. In this instance, a potential difference v(t) appearing between the opposite ends of the resistor R and capacitor C is given by the following expression:

$$v(t) = i_p \cdot R \cdot \{1 - \exp(-t/RC)\} u(t) \tag{2}$$

Accordingly, if the bistable semiconductor laser 88 starts its oscillation on such presumption as described above and a photoelectric current $i_p$ starts to flow through the photodiode 92, the potential at the point A in FIG. 13 starts to drop in such a manner as indicated by the waveform 118 in FIG. 17 in accordance with the function represented by the expression (2) above.

By the way, a relationship between a current and a voltage of the bistable semiconductor laser is such as indicated by a waveform 124 in FIG. 18 similarly as in a common semiconductor laser. In such current-voltage characteristic curve, if it is assumed that the bias point before starting of oscillation is a point B, the current $I_1$ drops as indicated by a curve 128 in FIG. 18 as the potential drops as indicated by a curve 126 in FIG. 18. Since the amplitude of a voltage signal can be determined in accordance with the photoelectric current $i_p$ and the load resistance R, if the voltage amplitude is set to a sufficiently high value, then the current $I_1$ will fall after lapse of a certain interval of time and become lower than the threshold level $I_{1\ OFF}$ (point C in FIG. 18). Thereupon, the bistable semiconductor laser 88 stops its oscillation, and at the same time the photoelectric current to flow through the photodiode 92 is reduced to zero (refer to the waveform of FIG. 17). Consequently, the potential at the point A of FIG. 13 returns to its initial value (point D in FIGS. 17 and 18) in accordance with the equation (2) with an inverse sign applied. However, the bistable semiconductor laser 88 remains in the off-state and continues to stop its oscillation until after an optical pulse is received subsequently. The pulse width of an input optical pulse can be expanded to a pulse width corresponding to a period of time from the point B to the point C of FIG. 17 in this manner, and a pulse having such expanded pulse width can be taken out as an output of the bistable semiconductor laser 88. It is to be noted that, since an optical output of the bistable semiconductor laser 88 is outputted in the two opposite directions from an active layer thereof as described hereinabove, even if one of light of the two outputs is introduced to the photodiode 92, another optical output having an expanded pulse width can be taken out in the opposite direction from the bistable semiconductor laser 88.

While the period of time from starting to stopping of oscillation of the bistable semiconductor laser 88 depends upon a time constant RC which in turn depends upon the resistance R of the load resistor 961 and the capacitance C of the load capacitor 962, a voltage-current characteristic of the bistable semiconductor laser 88, and a current bias condition, it is essentially controlled by the time constant RC. Accordingly, it is generally possible to set the period of time from starting to stopping of oscillation of the bistable semiconductor laser 88, that is, the pulse width (duty) of an expanded optical pulse, by specifying values of the load resistance and the load capacitance.

In this manner, according to the present embodiment, operation as an optical monostable multivibrator which is changed over into the on-state in response to inputting of an optical pulse and maintains the on-state for a period of time which depends upon a time constant RC can be realized in the form of an optical signal. In short, it is possible to expand the duty ratio of an optical pulse or produce a low speed optical clock from an optical frame pulse without executing electric synchronizing control.

Figure 19:
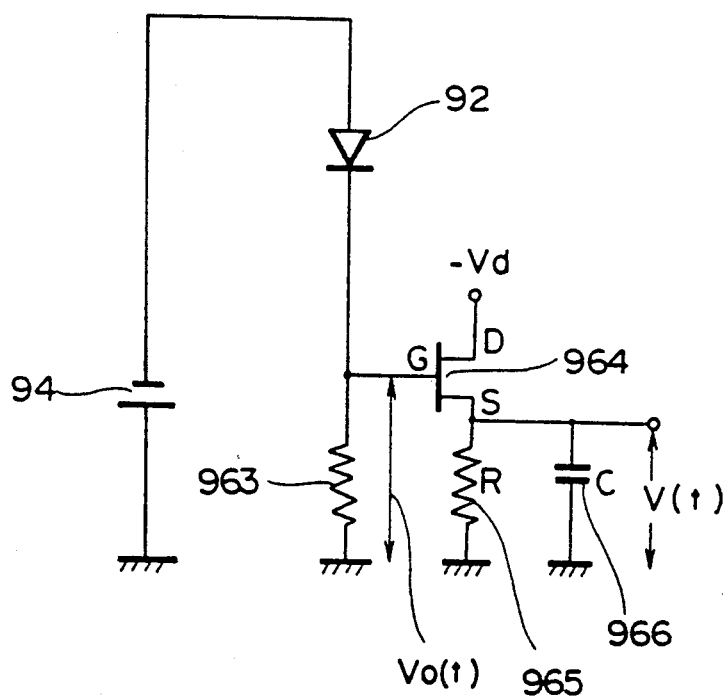
FIG. 19 is a circuit diagram showing another example of detailed construction of the optical monostable multivibrator of the embodiment shown in FIG. 11.

While the amplitude of a voltage signal to be fed back to the bistable semiconductor laser 88 depends upon a product $i_P R$ of an optical current $i_P$ and a load resistance R, in case the photoelectric current $i_P$ is so low that it is difficult to obtain a sufficiently high voltage signal, such a circuit construction as shown in FIG. 19 is adopted. The example shown is constituted such that a photoelectric current produced in the photodiode 92 flows through a first load resistor 963, and a voltage produced between the opposite ends of the first load resistor 963 when a photoelectric current flows through the first load resistor 963 is amplified by means of a transistor (field effect transistor in the present example) 964. The voltage signal is applied to the gate of the transistor 964 while a bias voltage $-V_d$ is applied to the drain of the transistor 964. An output signal (response signal) of the load circuit which includes the transistor 964 is taken out from the source of the transistor 964 and fed back to the current bias of the bistable semiconductor laser 88 by way of a capacitor not shown in a similar manner as in the circuit shown in FIG. 13. A second load resistor (having a resistance R) 965 and a load capacitor (having a capacitance C) 966 are connected between the source of the transistor 964 and the ground. With the construction described above, the pulse width of an output optical pulse can be determined in accordance with the resistance of the second load resistor 965 and the capacitance of the load capacitor 966. Meanwhile, since the amplitude of a response signal to be fed back to the current bias of the bistable semiconductor laser 88 corresponds to a product of an amplified source current and the resistance R of the second load resistor 965, even when the photoelectric current $i_P$ produced in the photodiode 92 is low, a response signal having a sufficiently great amplitude can be obtained. In this instance, if the construction is compared with an alternative case wherein the amplitude of a response signal is increased by increasing the resistance of the load resistor without amplifying a photoelectric current, then there is an effect that possible deterioration of the high speed characteristic can be prevented. In particular, if the resistance of the load resistor is increased, then the time constant represented by RC is increased accordingly, and the pulse width which can be produced is limited to a great one, but otherwise if a photoelectric current is amplified, then the resistance of the load resistor for obtaining a response signal of a predetermined amplitude may be a low one. Accordingly, the pulse width which can be produced is not limited to a great one.

Figure 20:
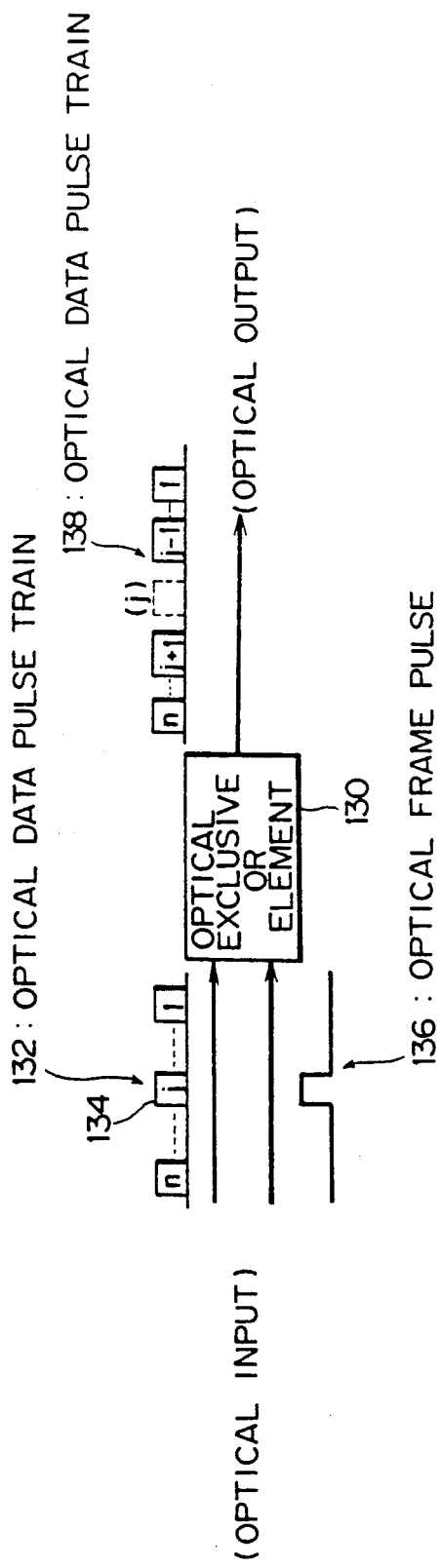
FIG. 20 is a diagrammatic representation showing an example of construction of optical pulse erasing means of the embodiment of the present invention.

FIG. 20 shows an example of construction of the optical pulse erasing means 10. In the example of construction, an optical exclusive OR element 130 is provided, and an optical data pulse train 132 and an optical frame pulse 136 are inputted to the optical exclusive OR element 130 with the optical frame pulse 136 overlapped with a specific optical data pulse (the j-th optical data pulse 134 in FIG. 20) in the optical data pulse train 132 so that an optical data pulse train 138 from which the specific optical data pulse is erased may be obtained as an output of the optical exclusive OR element 130.

Figure 21:
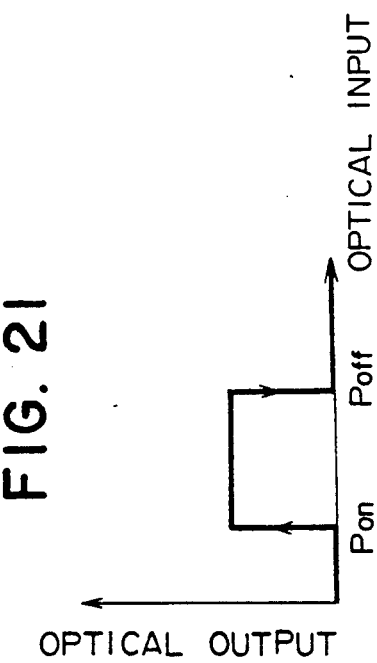
FIG. 21 is a diagram showing a characteristic of an optical exclusive OR element shown in FIG. 20.

The optical exclusive OR element 130 develops output light when a sum of the optical inputs thereto is within a range from a first threshold level $P_{on}$ to a second threshold level $P_{off}$ higher than the first threshold level $P_{on}$ but develops no output light when such sum of the optical inputs is outside the range as seen from an input-output characteristic curve of FIG. 21. Here, the concept of wording of "develops no output light" with respect to "develops output light" contains a concept of "develops output light having a comparatively low intensity" with respect to "develops output light having a comparatively high intensity".

Such an optical exclusive OR operation as described below can be realized by making use of such an element characteristic as described above. In particular, if optical inputs A and B having optical powers $P_A$ and $P_B$, respectively, which satisfy $$P_{on} < P_A < P_{off}, P_{on} < P_B < P_{off}$$

and also satisfy $$P_{off} < P_A + P_B$$

are inputted to the optical exclusive OR element 130, then the output F of the optical exclusive OR element 130 presents such values as listed in a truth table given as Table 1 below, thereby realizing an optical exclusive OR operation.

TABLE 1

| A | B | F |
|---|---|---|
| 1 | 0 | 1 |
| 0 | 1 | 1 |
| 0 | 0 | 0 |
| 1 | 1 | 0 |

In such optical exclusive OR operation, since the two optical inputs A and B are treated equivalently, only if an optical data pulse train is used simply as one of the optical inputs to the optical exclusive OR element 130 while an optical frame pulse for the erasure of an optical data pulse is used as the other optical input, a normal function of the optical pulse erasing means 10 cannot be attained. This is because, due to the fact that an optical frame pulse is inputted to the optical exclusive OR element 130 irrespective of presence or absence of an optical data pulse which is an object for the erasure, when an optical frame pulse is inputted for optical data of "0", the output will be "1", which will cause an error in operation.

Figure 22:
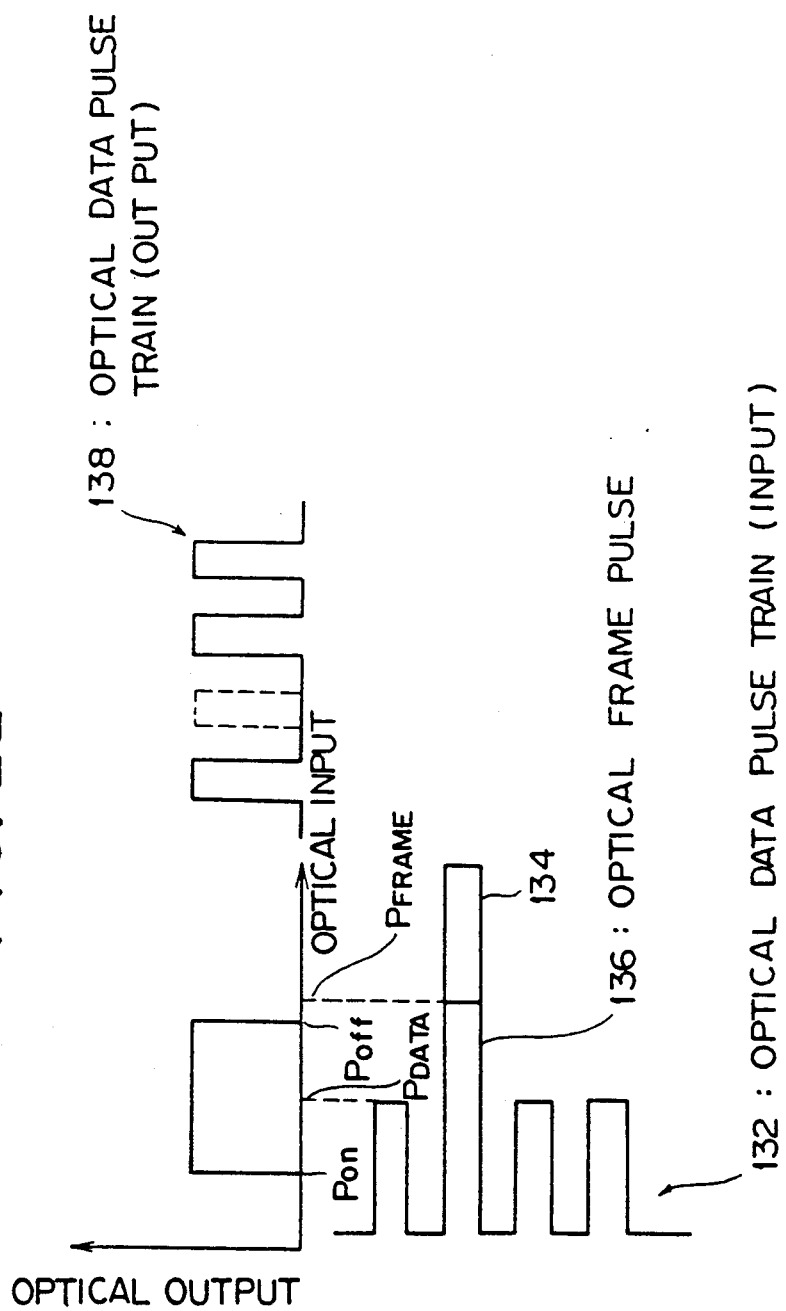
FIG. 22 is a diagram showing an example of operation characteristic of the optical pulse erasing means.

Thus, according to a first method, an optical data pulse train 132 having an optical power $P_{DATA}$ which satisfies $$P_{on} < P_{DATA} < P_{off}$$

and an optical frame pulse 136 which has an optical power $P_{FRAME}$ which satisfies $$P_{off} < P_{FRAME}$$

are inputted to the optical exclusive OR element 130 while the optical frame pulse 136 is overlapped with a specific optical data pulse 134 in the optical data pulse train 132 as shown in FIG. 22 so that an optical data pulse train 138 from which the specific optical data pulse is erased may be obtained as an output of the optical exclusive OR element 130.

In this instance, the inputs of data and a frame and an output F' present such a truth table as shown as Table 2 below. Thus, only when the data is "1" and the frame is "0", the output is "1", but in any other case, the output presents "0".

TABLE 2

| Data | Frame | F' |
|---|---|---|
| 1 | 0 | 1 |
| 0 | 1 | 0 |
| 0 | 0 | 0 |
| 1 | 1 | 0 |

With the first method, while an optical frame pulse having an optical power higher than the second threshold level, it is otherwise possible to use an optical frame pulse having a power lower than the first threshold level in order to attain the operation of the truth table shown in Table 2 above (second method).

Figure 23:
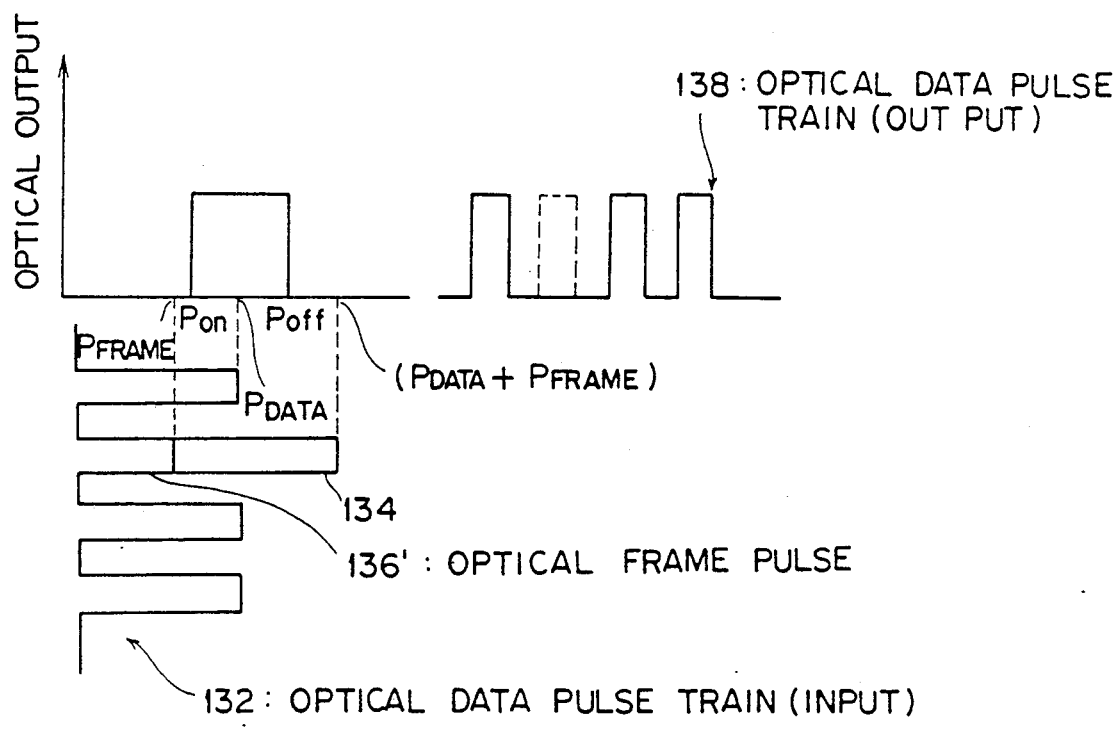
FIG. 23 is a similar view but showing another example of operation characteristic of the optical pulse erasing means.

In particular, according to the second method, the operation principle of which is illustrated in FIG. 23, an optical data pulse train 132 having an optical power $P_{DATA}$ which satisfies $$P_{on} < P_{DATA} < P_{off}$$

and an optical frame pulse 136' having an optical power $P_{FRAME}$ which satisfies $$P_{FRAME} < P_{on}, P_{off} < P_{DATA} + P_{FRAME}$$

are inputted to the optical exclusive OR element 130 while the optical frame pulse 136' is overlapped with a specific optical data pulse 134 in the optical data pulse train 132 so that an optical data pulse train 138 from which the specific optical data pulse is erased may be obtained as an output of the optical exclusive OR element 130.

In this manner, according to the first and second methods, a specific optical data pulse in a optical data pulse train can be erased with an optical signal, and accordingly, processing with an electric signal is unnecessary.

Figure 24:
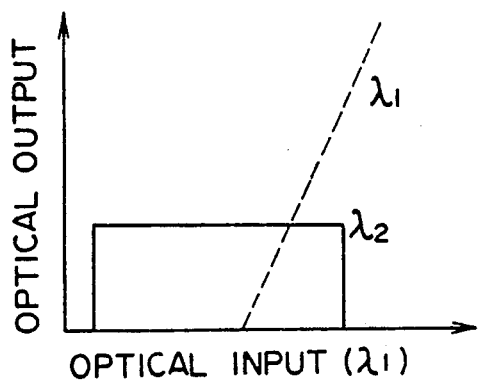
FIG. 24 is a diagram showing a characteristic of a main portion of an example of detailed construction of the optical exclusive OR element shown in FIG. 20.

The function of the optical exclusive OR element 130 is attained by using, for example, a wavelength converting laser as a principal component of the optical exclusive OR element. In particular, taking notice of the fact that, as shown in FIG. 24, a wavelength converting laser which is biased by an electric current lower than an oscillation threshold level outputs wavelength conversion light (wavelength $\lambda_2$) with respect to an optical input (wavelength $\lambda_1$) of a low level (except a level proximate to zero) but outputs, for an optical input (wavelength $\lambda_1$) of a high level, only amplified light (wavelength $\lambda_1$) while extinguishing wavelength conversion light (wavelength $\lambda_2$), a filter for selectively passing light of a wavelength $\lambda_2$ therethrough is additionally provided adjacent an output end of the wavelength converting laser so that only wavelength conversion light (wavelength $\lambda_2$) may be outputted, thereby attaining the function of the optical exclusive OR element.

By the way, since the optical powers of optical pulses to be inputted to the pulse width expanding means 8 and the optical pulse erasing means 10 must necessarily be specified in order to assure normal operation of the individual means in the embodiments described hereinabove, if an optical power of an optical data pulse train from the optical highway is fluctuated or dispersed, then normal operation of the individual means may not sometimes be assured. Accordingly, it is desirable that the optical power of an optical data pulse train to be inputted to an optical drop-and-insert apparatus is in a stabilized condition and that also the optical power of an optical data pulse train to be outputted from the optical drop-and-insert apparatus to the optical highway is in a stabilized condition.

Figure 25:
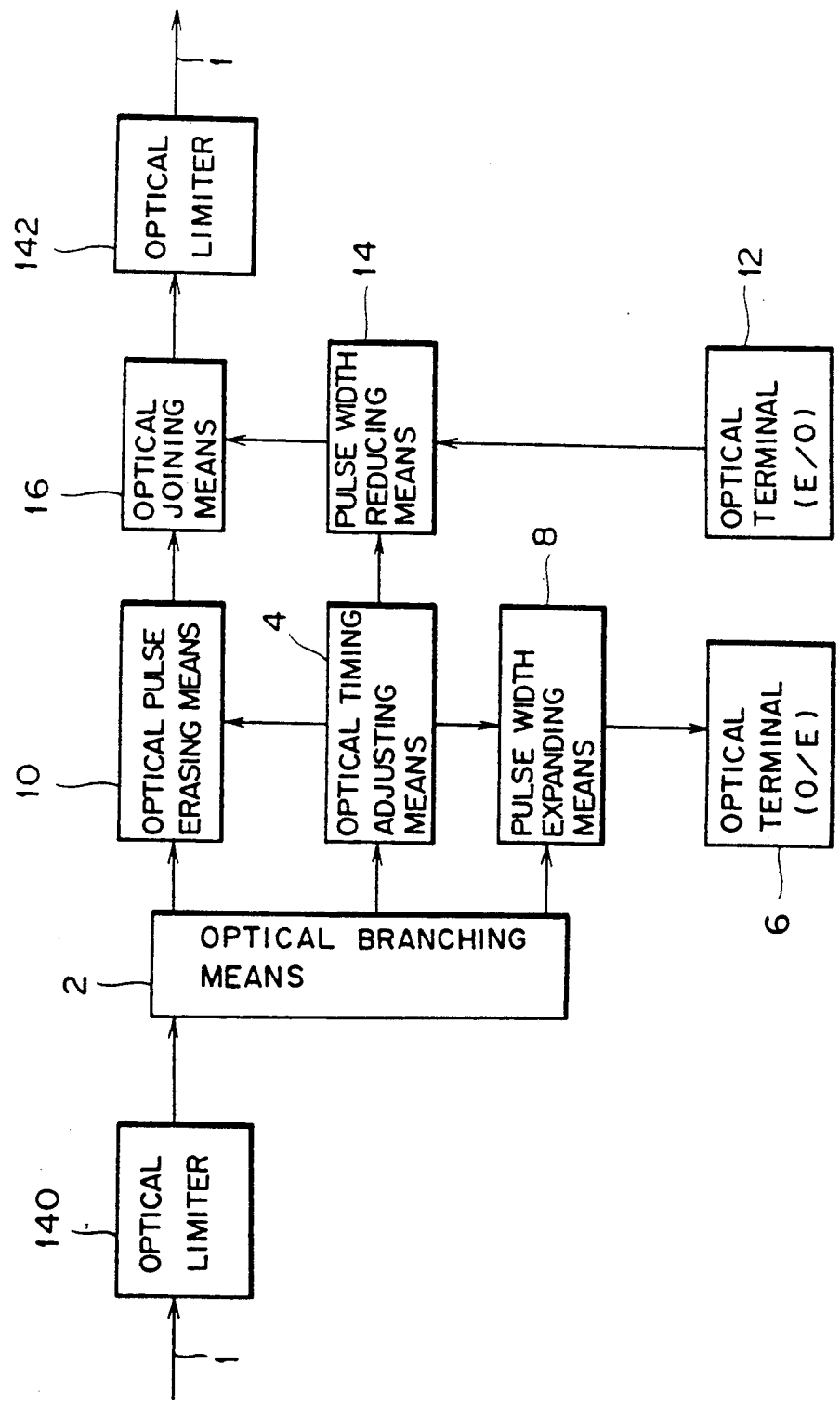
FIG. 25 is a block diagram showing basic construction of an optical drop-and-insert apparatus which additionally includes a pair of optical limiters provided on the input and output sides thereof.

An example of construction of an optical drop-and-insert apparatus which satisfies such a requirement as described above is shown in FIG. 25. In the present example, an optical limiter 140 is provided on the upstream side of optical branching means 2. Meanwhile, another optical limiter 142 is provided also on the downstream side of optical joining means 16. Each of the optical limiters 140 and 142 is provided to provide, to an optical threshold element having an optical output which is saturated in accordance with an increase of the level of an optical input, an optical pulse train which involves different levels and is within a range with which, when the optical pulse train is received by the optical threshold element, the optical output level of the optical threshold element is saturated so that another optical pulse train either having a smaller level difference than the level difference of the received optical pulse train or having no level difference may be provided as an optical output of the optical threshold element.

Figure 26:
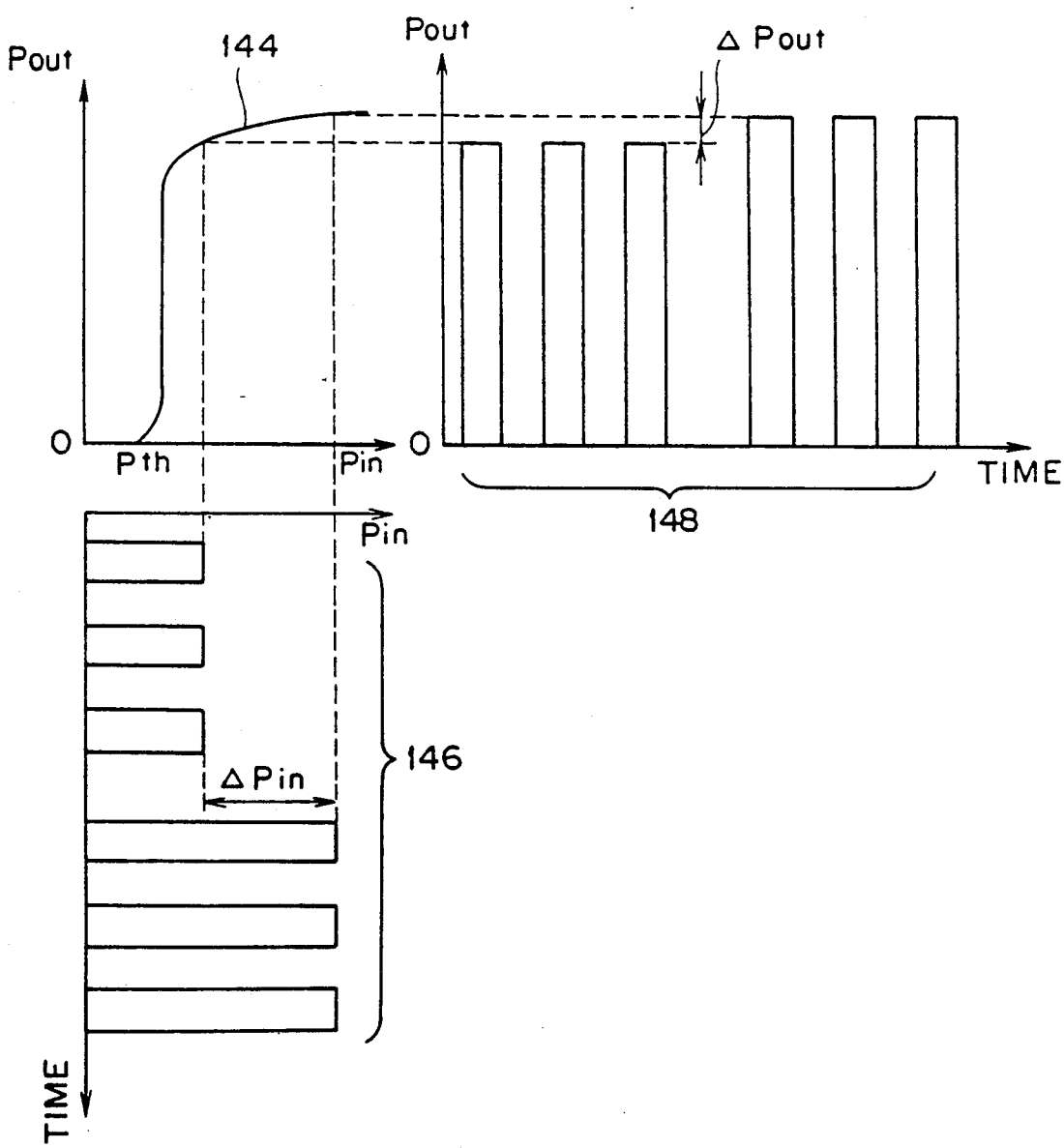
FIG. 26 is a diagram showing an operation characteristic of the optical limiter provided additionally on the input side.

The optical threshold element of the optical limiter 140 on the input side has such an input/output characteristic that the optical output level $P_{out}$ is saturated as the optical input level $P_{in}$ increases as seen from a characteristic curve 144 in FIG. 26. In particular, the optical threshold element has such a characteristic that the optical output level $P_{out}$ thereof rises steeply when the optical input level $P_{in}$ exceeds a predetermined threshold level $P_{th}$, but even if the optical input level $P_{in}$ increases further, the optical output level $P_{out}$ does not increase linearly with respect to the optical input level $P_{in}$ but becomes saturated and does not present a significant variation. When an optical pulse train 146 having a level difference $\Delta P_{in}$ is introduced to the optical threshold element having such characteristics, in case the level of the input optical pulse train 146 is higher than the threshold level $P_{th}$, an optical pulse train 148 having a level difference $\Delta P_{out}$ which is very smaller than the level difference $\Delta P_{in}$ is obtained as an output of the optical threshold element. In this instance, where the saturation region of the characteristic curve has a flattened configuration, the level difference $\Delta P_{out}$ in an optical pulse train to be outputted from the optical threshold element is substantially equal to zero. Stabilization of the level of an optical pulse train is attained in this manner.

Figure 27:
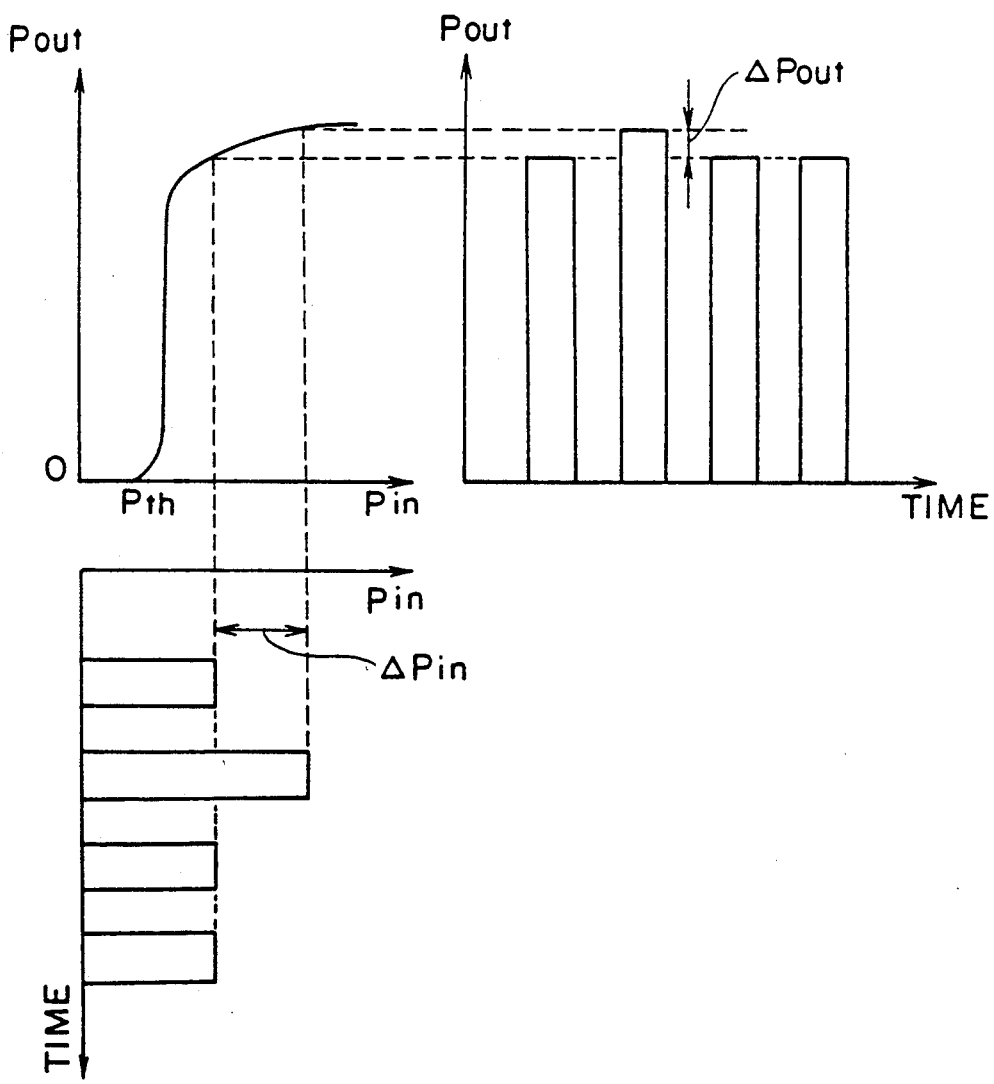
FIG. 27 is a diagram showing an operation characteristic of the optical limiter provided additionally on the output side.

Also the optical limiter 142 on the output side functions in a similar manner to that of the optical limiter on the input side. An operation characteristic of the optical limiter 142 is shown in FIG. 27. It is considered now that there is a level difference $\Delta P_{in}$ between the level of an optical pulse train from the optical pulse erasing means 10 and the level of an optical pulse from the pulse width reducing means 14. In this instance, if the optical threshold element has an input/output characteristic similar to that of the optical limiter 140 on the input side, then an output optical pulse train to be outputted in response to an input optical pulse train will either have a level difference $\Delta P_{out}$ sufficiently smaller than the level difference $\Delta P_{in}$ or have little level difference. The level of an optical pulse train after joining with an optical signal can be stabilized in this manner. It is to be noted that, where an optical threshold element has a function also as an optical amplifier, compensation for a loss of an optical signal caused in an optical transmission line can be attained.

Figure 28A:
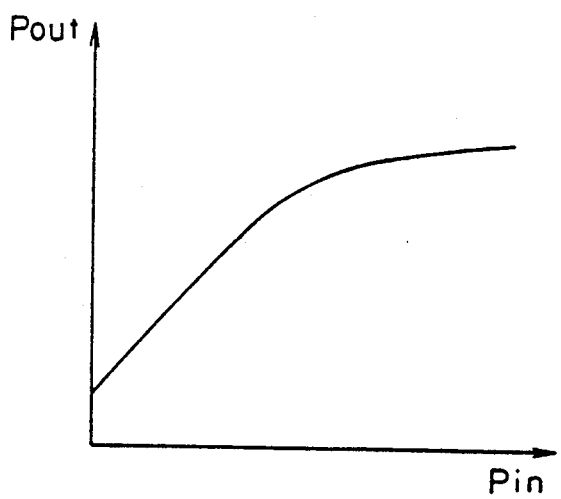
FIGS. 28A, 28B and 28C are diagrams illustrating characteristics and so forth of an optical threshold element which is a component of the optical limiters shown in FIG. 25.

The optical threshold elements can be constructed similarly to that of the pulse width expanding means 8 or of the pulse width reducing means 14. More particularly, each of the optical threshold elements may be, for example, a semiconductor laser optical amplifier of the traveling wave type having an end face reflectance lower than 0.5% or so or an optical amplifier of the fiber type wherein the core is doped with a rare earth element or the like. The input/output characteristic of the optical threshold element in this instance does not present such a steep rise of an optical output level as shown in FIG. 28A but exhibits saturation of an optical output level in accordance with an increase of an optical input level. Accordingly, stabilization of the level of an optical pulse train can be attained by employing a semiconductor laser optical amplifier of the traveling wave type or an optical amplifier of the fiber type.

Figure 28B:
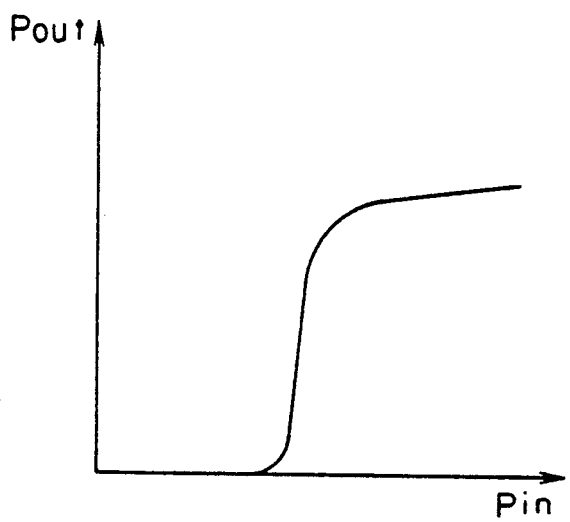

Also a semiconductor laser optical amplifier of the Fabry-Perot type constructed so as to have a suitable end face reflectance or a bistable semiconductor laser may be employed as an optical threshold element. The input/output characteristic in this instance exhibits saturation of an optical output level in accordance with an increase of an optical input level and besides exhibits a steep rise of an optical output level as shown in FIG. 28B. Accordingly, where a semiconductor laser optical amplifier of the Fabry-Perot type or a bistable semiconductor laser is employed, in addition to the fact that stabilization of the level of an optical pulse train can be attained, noises of a low level at a space signal in an optical pulse train can be reduced, and a waveform shaping action is produced by a steep rise characteristic of an optical output. It is to be noted that, where a bistable semiconductor laser is employed, the current bias is set so that an extreme hysteresis may not be caused in the input/output characteristic.

Figure 28C:
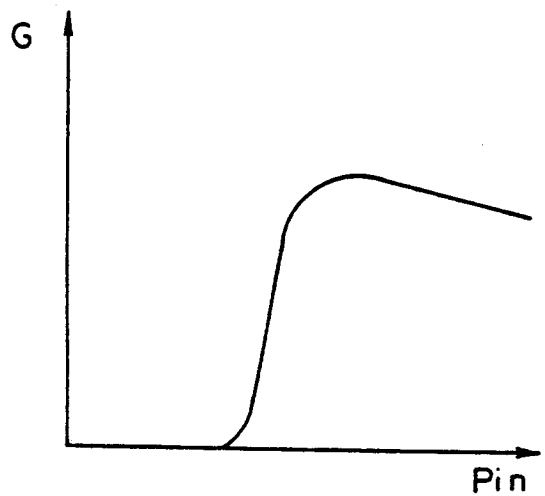

By the way, while the characteristic curve shown in FIG. 28B indicates a relationship between an optical output level $P_{out}$ and an optical input level $P_{in}$, it can be converted into such a characteristic curve representing a gain G and an optical input level $P_{in}$ as shown in FIG. 28C. In particular, the gain G decreases as the optical input level $P_{in}$ increases. Accordingly, depending upon the optical input level $P_{in}$ or driving conditions of the optical threshold element, a gain may not be obtained but a loss is obtained. If the optical threshold element functions also as an optical amplifier, then a loss of an optical signal in the optical transmission line can be compensated for. From this point of view, the optical input level and the driving conditions are preferably set so that the optical threshold element may yield a gain.

While description has been given of the specific embodiments of the present invention in the foregoing description, the present invention is not limited to such particulars of the embodiments. For example, while the preferred embodiments shown in the drawings employ an optical coupler or a combination of couplers as optical branching means or optical joining means, it is otherwise possible to construct the optical branching means or optical joining means using a half mirror or an optical element of the bulk type having an equivalent function to that of a half mirror or using a combination of such half mirrors and/or optical elements. Meanwhile, various means other than those shown in the drawings and described herein may be recognized clearly by those skilled in the art. Further, the individual means may be realized on a single substrate or on a small number of substrates, and connection between the means may be achieved by means of an optical wave guide. Accordingly, the preferred embodiments described hereinabove are illustrative but not restrictive. The scope of the present invention is defined by appended claims, and all modifications and alterations which belong to a range of equivalency of claims are within the scope of the present invention.

What is claimed is:

1. An optical drop-and-insert apparatus, comprising:
    optical branching means for receiving an input optical data pulse train from an optical highway, branching the received input optical data pulse train into at least three optical data pulse trains and outputting the thus branched optical data pulse trains in different routes;
    optical timing adjusting means for receiving a first optical data pulse train from said optical branching means and outputting an optical frame pulse synchronized with a first desired bit of the received first optical data pulse train;
    pulse width expanding means for receiving a second optical data pulse train and the optical frame pulse from said optical branching means and said optical timing adjusting means, respectively, and expanding the pulse width of a first optical data pulse of a second desired bit of the received second optical data pulse train in accordance with the received optical frame pulse to output a reduced speed optical data pulse to a first optical terminal;
    optical pulse erasing means for receiving a third optical data pulse train and the optical frame pulse from said optical branching means and said optical timing adjusting means, respectively, and erasing a second optical data pulse of a third desired bit of the received third optical data pulse train in response to the received optical frame pulse to output a modified optical data pulse train from which the second optical data pulse of the third desired bit is erased:
    pulse width reducing means for receiving a low speed optical data pulse and the optical frame pulse from a second optical terminal and said optical timing adjusting means, respectively, and outputting a high speed optical data pulse synchronized with the received optical frame pulse in a synchronized relationship with the third desired bit of the modified optical data pulse train received from said optical pulse erasing means; and
    optical joining means for receiving the high speed optical data pulse and the modified optical data pulse train from said pulse width reducing means and said optical pulse erasing means, respectively, adding the received high speed optical data pulse and the received modified optical data pulse train and outputting the added optical data pulse train.

2. An apparatus according to claim 1, wherein said optical branching means includes
    a first optical coupler for receiving the input optical data pulse train from said optical highway, branching the received input optical data pulse train into one of the first, second and third optical data pulse trains and an intermediate optical data pulse train and outputting the thus branched one of the first, second and third optical data pulse trains and intermediate optical data pulse train in different routes, and a second optical coupler for receiving the intermediate optical data pulse train from said first optical coupler, branching the receiving intermediate optical data pulse train into the others of the first, second and third optical data pulse trains and outputting the thus branched others of the first, second and third optical data pulse trains in different routes.

3. An apparatus according to claim 1, wherein said optical timing adjusting means includes a frame extracting circuit for extracting the optical frame pulse from the first optical data pulse train received from said optical branching means, and a frame delay circuit for delaying the optical frame pulse from said frame extracting circuit for a predetermined period of time and outputting the delayed optical frame pulse in a synchronized relationship with the first desired bit of the first optical data pulse train from said optical branching means.

4. An apparatus according to claim 3, wherein said frame delay circuit includes an optical switch having first and second input ports and first and second output ports and constructed for switching operation between a bar condition wherein an optical signal received at said first input port is outputted from said first output port and an optical signal received at said second input port is outputted from said second output port and a cross condition wherein an optical signal received at said first input port is outputted from said second output port and an optical signal received at said second input port is outputted from said first output port, an optical delay line connected between said second output port and said second input port for providing a delay time greater than the pulse width of the optical frame pulse, and a controlling circuit for controlling said optical switch such that the optical frame pulse received at said first input port is taken into said optical delay line in the cross condition of said optical switch and then the optical frame pulse thus taken in is circulated by a required number of times in said optical delay line in the bar condition of said optical switch whereafter the optical frame pulse is outputted from the first output port in the cross condition again of said optical switch.

5. An apparatus according to claim 4, wherein said optical delay line includes an optical amplifier.

6. An apparatus according to claim 5, wherein said optical amplifier is of the semiconductor laser type.

7. An apparatus according to claim 5, wherein said optical amplifier is an optical amplifier of the fiber type doped with a rare earth element.

8. An apparatus according to claim 3, wherein the third desired bit with which the optical frame pulse from said frame delay circuit is synchronized at said optical pulse erasing means coincides with the third desired bit with which the optical frame pulse is synchronized at said pulse width reducing means.

9. An apparatus according to claim 8, wherein the first desired bit with which the optical frame pulse from said frame delay circuit is synchronized at said pulse width expanding means coincides with the third desired bit with which the optical frame pulse is synchronized at said optical pulse erasing means and said pulse width reducing means.

10. An apparatus according to claim 8, wherein the first desired bit with which the optical frame pulse from said frame delay circuit is synchronized at said pulse width expanding means is different from the third desired bit with which the optical frame pulse is synchronized at said optical pulse erasing means and said pulse width reducing means.

11. An apparatus according to claim 1, wherein said pulse width expanding means includes an optical threshold element for receiving the second optical data pulse train and the optical frame pulse with the optical frame pulse selectively overlapped with the second desired bit of the second optical data pulse train and producing a threshold optical data pulse by developing no optical output when the optical input is lower than a threshold level and by developing a high optical output when the optical input exceeds the threshold level, an optical bistable element for receiving the threshold optical data pulse from said optical threshold element and developing an optical output having a hysteresis characteristic with respect to the optical input, and an optical clock generating circuit for supplying to said optical bistable element an optical clock with which the threshold optical data pulse from said optical threshold element is to be overlapped to change the duty of the threshold optical data pulse.

12. An apparatus according to claim 1, wherein said pulse width expanding means includes an optical threshold element for receiving the second optical data pulse train and the optical frame pulse with the optical frame pulse selectively overlapped with the second desired bit of the second optical data pulse train and producing a threshold optical data pulse by developing no optical output when the optical input is lower than a threshold level and by developing a high optical output when the optical input exceeds the threshold level, and an optical monostable multivibrator for developing when the threshold optical data pulse is received from said optical threshold element, the reduced speed optical data pulse having a pulse width greater than the pulse width of the received first optical data pulse.

13. An apparatus according to claim 12, wherein said optical monostable multivibrator includes a bistable semiconductor laser, a variable voltage or current source for applying a current bias to said bistable semiconductor laser so that said bistable semiconductor laser may assume two stable states including an on-state and an off-state, a photodiode for receiving at least part of an optical output of said bistable semiconductor laser, a voltage source for applying a reverse bias to said photodiode, and a load circuit through which a photoelectric current produced in said photodiode flows, a response signal of said load circuit to the photoelectric current being fed back to the current bias to switch said bistable semiconductor laser, which has been put into the on-state by inputting of the threshold optical data pulse, into the off-state.

14. An apparatus according to claim 13, wherein said load circuit includes a load resistor and a load capacitor through which the photoelectric current flows, and the pulse width of the reduced speed optical data pulse to be outputted is determined in accordance with a resistance of said load resistor and a capacitance of said load capacitor.

15. An apparatus according to claim 13, wherein said load circuit includes
- a first load resistor through which the photoelectric current flows,
- a transistor for amplifying a voltage between the opposite ends of said first load resistor, and
- a second load resistor and a load capacitor to which an amplified output of said transistor is coupled, the pulse width of the reduced speed optical data pulse to be outputted being determined in accordance with a resistance of said second load resistor and a capacitance of said load capacitor.

16. An apparatus according to claim 1, wherein said optical pulse erasing means includes an optical exclusive OR element which develops output light when a sum of optical inputs is within a range between a first threshold level ($P_{on}$) and a second threshold level ($P_{off}$) higher than the first threshold level ($P_{on}$) but develops no output light when such sum of optical inputs is outside the range, said optical exclusive OR element receiving the third optical data pulse train having an optical power ($P_{DATA}$) which satisfies $$P_{on} < P_{DATA} < P_{off}$$

and the optical frame pulse having an optical power ($P_{FRAME}$) which satisfies $$P_{off} < P_{FRAME}$$

while the optical frame pulse is overlapped with the second optical data pulse in the third optical data pulse train so that the third optical data pulse train from which the second optical data pulse is erased may be obtained as an output of said optical exclusive OR element.

17. An apparatus according to claim 1, wherein said optical pulse erasing means includes an optical exclusive OR element which develops output light when a sum of optical inputs is within a range between a first threshold level ($P_{on}$) and a second threshold level ($P_{off}$) higher than the first threshold level ($P_{on}$) but develops no output light when such sum of optical inputs is outside the range, said optical exclusive OR element receiving the third optical data pulse train having an optical power ($P_{DATA}$) which satisfies $$P_{on} < P_{DATA} < P_{off}$$

and the optical frame pulse having an optical power ($P_{FRAME}$) which satisfies $$P_{FRAME} < P_{on}, P_{off} < P_{DATA} + P_{FRAME}$$

while the optical frame pulse is overlapped with the second optical data pulse in the third optical data pulse train so that the third optical data pulse train from which the second optical data pulse is erased may be obtained as an output of said optical exclusive OR element.

18. An apparatus according to claim 1, wherein said pulse width reducing means includes
- an optical threshold element for receiving the low speed optical data pulse and the optical frame pulse from said second optical terminal and said optical timing adjusting means, respectively, and developing no optical output when the optical input is lower than a threshold level but developing a high optical output when the optical input exceeds the threshold level,
- the threshold level being set higher than the level of the low speed optical data pulse and the level of the optical frame pulse but lower than the level of the optical frame pulse overlapped with the low speed optical data pulse.

19. An apparatus according to claim 1, wherein said optical joining means includes an optical coupler having
- at least two input ports to which said optical pulse erasing means and said pulse width reducing means are connected, and
- at least one output port to which said optical highway is connected.

20. An apparatus according to claim 1, further comprising an optical limiter provided on the upstream side of said optical branching means and including an optical threshold element having an optical output with a level which is saturated as the level of an optical input increases, said optical threshold element receiving an original optical pulse train which has different levels and is within a region wherein, when the original optical pulse train is received by said optical threshold element, the level of the optical output of said optical threshold element is saturated and said optical limiter may develop the input optical data pulse train either having a level difference smaller than the level difference of the received original pulse train or having no level difference as the optical output of said optical threshold element.

21. An apparatus according to claim 1, further comprising an optical limiter provided on the downstream side of said optical joining means and including an optical threshold element having an optical output with a level which is saturated as the level of an optical input increases, said optical threshold element receiving the added optical data pulse train which has different levels and is within a region wherein, when the added optical data pulse train is received by said optical threshold element, the level of the optical output of said optical threshold element is saturated and said optical limiter may develop an output optical pulse train having a level difference smaller than the level difference of the received added optical data pulse train or having no level difference as the optical output of said optical threshold element.

* * * * *

UNITED STATES PATENT AND TRADEMARK OFFICE
CERTIFICATE OF CORRECTION

PATENT NO. : 5,165,077

DATED : November 17, 1992

INVENTOR(S) : Hiroyuki Rokugawa et al.

It is certified that error appears in the above-identified patent and that said Letters Patent is hereby corrected as shown below:

Col. 3, line 52, delete "FIG. 8 is a diagram" and insert --FIGS. 8A-8C are diagrammatic representations--; and line 55, delete "FIG. 9 is a diagram" and insert --FIGS. 9A-9C are diagrammatic representations--.

Figure 18A:
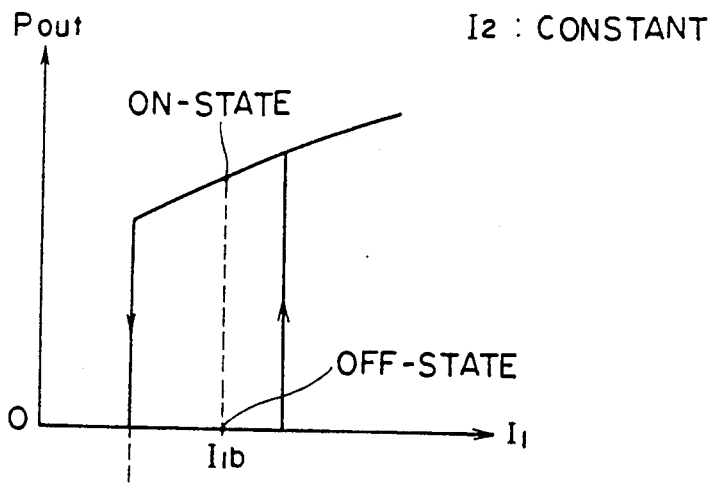
FIG. 18 is a diagram showing an operation characteristic of the optical monostable multivibrator.
Figure 18B:
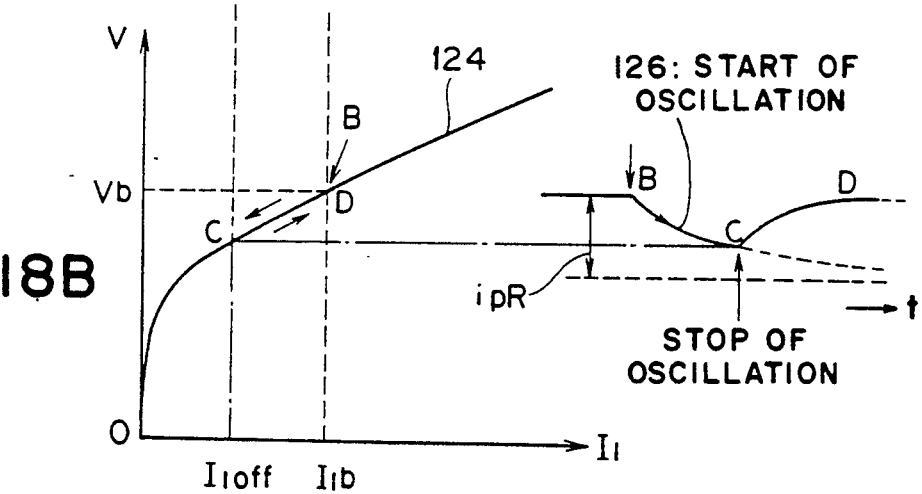
Figure 18C:
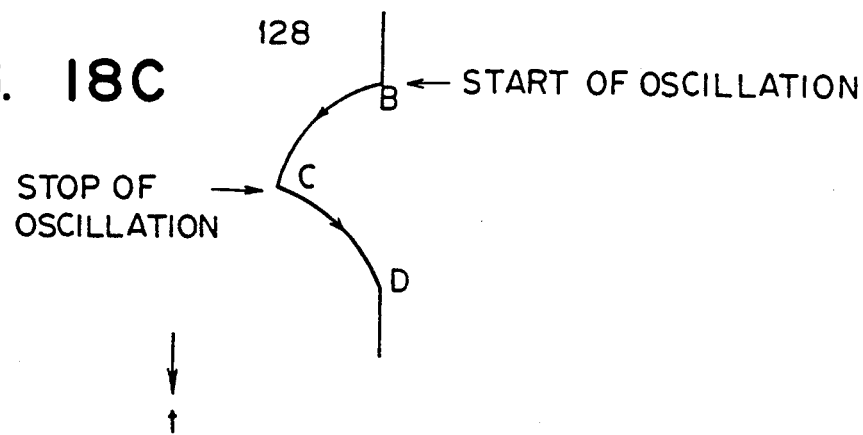

Col. 4, line 9, delete "FIG. 17 is a timing chart" and insert --FIGS. 17A-17E are timing charts--; and line 11, delete "FIG. 18 is a diagram" and insert --FIGS. 18A-18C are diagrammatic representations--.

Col. 8, line 66, delete "(FIG. 9)" and insert --(FIGS. 9A-9C)--.

Col. 9, line 27, delete "FIG. 8" and insert --(FIGS. 8A-8C)--;

line 37, change "8" to --8A--;

line 49, change "8" to --8C--;

line 51, change "8" to --8B--;

line 64, change "9" to --9A--; and line 68, change "9" to --9C--.

Col. 10, line 11, change "9" to --9B--.

Col. 12, line 6, delete "FIG. 9" and insert --FIGS. 9A-9C--.

Col. 13, line 27, delete "FIG. 17 is a waveform diagram" and insert --FIGS. 17A-17E are waveform diagrams--; and line 54, change "17" to --17C--.

UNITED STATES PATENT AND TRADEMARK OFFICE
CERTIFICATE OF CORRECTION

PATENT NO.  : 5,165,077
DATED       : November 17, 1992
INVENTOR(S) : Hiroyuki Rokugawa et al.

It is certified that error appears in the above-identified patent and that said Letters Patent is hereby corrected as shown below:

Col. 14, line 11, change "17" to --17D--;

line 15, change "18" to --18B--;

line 19, change "18" to --18C--;

line 20, change "18" to --18B--;

line 27, delete "FIG. 18" and insert --FIGS. 18B and 18C--;

line 30, change "17" to --17C--;

line 32, delete "17 and 18" and insert --17D, 17E, 18B and 18C--; and line 39, delete "FIG. 17" and insert --FIGS. 17D and 17E--.

Signed and Sealed this

Third Day of May, 1994

Attest:

BRUCE LEHMAN

Attesting Officer

Commissioner of Patents and Trademarks